US012584035B2

(12) United States Patent
Campos et al.

(10) Patent No.: US 12,584,035 B2
(45) Date of Patent: Mar. 24, 2026

(54) FLOW CELLS

(71) Applicant: ILLUMINA, INC., San Diego, CA (US)

(72) Inventors: Raymond Campos, San Diego, CA (US); Brian D. Mather, San Diego, CA (US); Sean M. Ramirez, San Diego, CA (US)

(73) Assignee: Illumina, Inc., San Diego, CA (US)

( * ) Notice: Subject to any disclaimer, the term of this patent is extended or adjusted under 35 U.S.C. 154(b) by 674 days.

(21) Appl. No.: 18/013,188

(22) PCT Filed: Oct. 19, 2021

(86) PCT No.: PCT/US2021/055616
§ 371 (c)(1),
(2) Date: Dec. 27, 2022

(87) PCT Pub. No.: WO2022/086964
PCT Pub. Date: Apr. 28, 2022

(65) Prior Publication Data
US 2023/0295455 A1 Sep. 21, 2023

Related U.S. Application Data

(60) Provisional application No. 63/094,147, filed on Oct. 20, 2020.

(51) Int. Cl.
*C09D 133/24* (2006.01)

(52) U.S. Cl.
CPC .................................. *C09D 133/24* (2013.01)

(58) Field of Classification Search
CPC ...... C08F 220/54; C08F 220/603; C08F 8/30; C09D 133/24
See application file for complete search history.

(56) References Cited

U.S. PATENT DOCUMENTS 9,012,022 B2 4/2015 George et al.
9,994,687 B2 6/2018 Berti et al.
(Continued)

FOREIGN PATENT DOCUMENTS

WO 2020005503 A1 1/2020
WO 2020126598 A1 6/2020

OTHER PUBLICATIONS

Palm et al., "Reactivity of Organic Compounds", vol. XIV, 1(49), Tartu State University, 1977, pp. 337-338, 1977.
(Continued)

*Primary Examiner* — Jennifer Wecker
(74) *Attorney, Agent, or Firm* — Dierker & Kavanaugh, P.C.

(57) ABSTRACT

A flow cell includes a substrate and a copolymer coating. The copolymer coating includes copolymer chains, each having recurring units of formula (I): and formula (II):. In formula (I), $R^1$ is —H, a halogen, an alkyl, an alkoxy, an alkenyl, an alkynyl, a cycloalkyl, an aryl, a heteroaryl, a heterocycle, or optionally substituted variants thereof; $R^2$ is an azido; each $(CH_2)_p$ can be optionally substituted; and p is an integer from 1 to 50. In formula (II), each of $R^3$, $R^{3'}$, $R^4$, $R^{4'}$ is —H, $R^5$, —$OR^5$, —$C(O)OR^5$, —$C(O)R^5$, —$OC(O)R^5$, —$C(O)NR^6R^7$, or —$NR^6R^7$; $R^5$ is —H, —OH, an alkyl, a cycloalkyl, a hydroxyalkyl, an aryl, a heteroaryl, a heterocycle, or optionally substituted variants thereof; and each of $R^6$ and $R^7$ is —H or an alkyl. Some copolymer chains include at least one alkoxyamine end group.

formula (I)

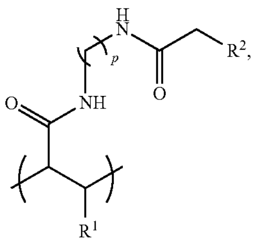

formula (II)

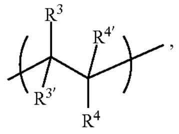

28 Claims, 6 Drawing Sheets

(56) References Cited

U.S. PATENT DOCUMENTS

2018/0327832 A1 11/2018 Ramirez et al.
2024/0426739 A1* 12/2024 Fisher .................. B01J 19/0046

OTHER PUBLICATIONS

Karger et al., "DNA sequencing by CE", Electrophoresis 2009, 30, S196-202, 2009.
Zezin, "High-molecular compounds: Textbook and practical training for the academic bachelor's degree", Yurait, 2016, p. 340, 2016.
Nein et al., "Chemistry and Technology of Macromolecular Compounds: A Textbook", Yekaterinburg, Ural University Press, 2018, p. 116, 2018.

* cited by examiner

FLOW CELLS

CROSS-REFERENCE TO RELATED APPLICATION

This application claims the benefit of U.S. Provisional Application Ser. No. 63/094,147, filed Oct. 20, 2020, the contents of which is incorporated by reference herein in its entirety.

BACKGROUND

Polymer or hydrogel-coated substrates are used in many technological applications. In one example, implantable medical devices can be coated with biologically inert polymers. In another example, a wound dressing may be coated with a thin hydrogel layer. In yet another example, polymer or hydrogel coated substrates may be used for the preparation and/or analysis of biological molecules. Some molecular analyses, such as certain nucleic acid sequencing methods, involve the attachment of nucleic acid strands to a polymer or hydrogel-coated surface of a substrate in a flow cell.

SUMMARY

An example flow cell disclosed herein includes a copolymer coating that includes at least one alkoxyamine end group. Another example flow cell disclosed herein includes a copolymer coating that includes at least one side chain with an alkoxyamine group. The alkoxyamine group(s) provide the copolymer coating with additional attachment site(s) to a flow cell surface.

INTRODUCTION

A first aspect disclosed herein is a flow cell comprising a substrate and a copolymer coating attached to at least a portion of the substrate, the copolymer coating including a plurality of copolymer chains, wherein each copolymer chain includes: a first recurring unit of formula (I):

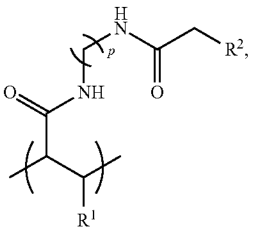

wherein: $R^1$ is selected from the group consisting of —H, a halogen, an alkyl, an alkoxy, an alkenyl, an alkynyl, a cycloalkyl, an aryl, a heteroaryl, a heterocycle, and optionally substituted variants thereof; $R^2$ is an azido; each $(CH_2)_p$ can be optionally substituted; and p is an integer from 1 to 50; a second recurring unit of formula (II):

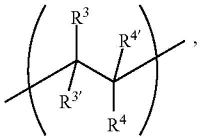

wherein: each of $R^3$, $R^{3'}$, $R^4$, $R^{4'}$ is independently selected from the group consisting of —H, $R^5$, —$OR^5$, —$C(O)OR^5$, —$C(O)R^5$, —$OC(O)R^5$, —$C(O)NR^6R^7$, and —$NR^6R^7$; $R^5$ is selected from the group consisting of —H, —OH, an alkyl, a cycloalkyl, a hydroxyalkyl, an aryl, a heteroaryl, a heterocycle, and optionally substituted variants thereof; and each of $R^6$ and $R^7$ is independently selected from the group consisting of —H and an alkyl; and wherein at least some of the copolymer chains include at least one alkoxyamine end group.

In an example of the first aspect, the substrate includes a base support and a plurality of norbornene silane molecules attached to the base support. In some examples, at least one of the plurality of norbornene silane molecules attaches to a respective copolymer chain through the at least one alkoxyamine end group.

In an example of the first aspect, $R^2$ of some of the copolymer chains is replaced with tetramethylethylenediamine. In some examples, the copolymer coating includes some branched copolymer chains.

In an example of the first aspect, each of $R^{3'}$, $R^4$, and $R^{4'}$ is —H; $R^3$ is —$C(O)NR^6R^7$; and each of $R^6$ and $R^7$ is —H. In some examples, $R^1$ is —H; and p is 5.

In an example of the first aspect, the substrate includes depressions separated by interstitial regions; and the copolymer coating is attached within the depressions.

In an example of the first aspect, the copolymer coating forms isolated pads on a surface of the substrate; and interstitial regions separate the isolated pads.

In an example of the first aspect, the first recurring unit and the second recurring unit form a random copolymer; or the first recurring unit and the second recurring unit form a statistical copolymer; or the first recurring unit and the second recurring unit form a block copolymer.

It is to be understood that any features of the flow cell disclosed herein may be combined together in any desirable manner and/or configuration to achieve the benefits as described in this disclosure, including, for example, enhanced attachment of the copolymer coating to the flow cell substrate.

A second aspect disclosed herein is a method comprising copolymerizing a reaction mixture of monomers of formula (III):

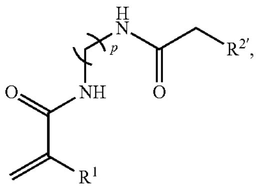

and monomers of formula (IV):

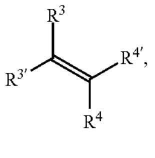

wherein: for formula (III): $R^1$ is selected from the group consisting of —H, a halogen, an alkyl, an alkoxy, an alkenyl, an alkynyl, a cycloalkyl, an aryl, a heteroaryl, a heterocycle, and optionally substituted variants thereof; $R^{2'}$ is an azido or a halogen; each $(CH_2)_p$ can be optionally substituted; and p is an integer from 1 to 50; and for formula (IV): each of $R^3$, $R^{3'}$, $R^4$, $R^{4'}$ is independently selected from the group consisting of —H, $R^5$, —$OR^5$, —C(O)$OR^5$, —C(O)$R^5$, —OC(O)$R^5$, —C(O)$NR^6R^7$, and —$NR^6R^7$; $R^5$ is selected from the group consisting of —H, —OH, an alkyl, a cycloalkyl, a hydroxyalkyl, an aryl, a heteroaryl, a heterocycle, and optionally substituted variants thereof; and each of $R^6$ and $R^7$ is independently selected from the group consisting of —H and an alkyl; adding i) a nitroxide mediated polymerization unimolecular initiator or ii) a combination of a water soluble initiator and a nitroxide to the reaction mixture to initiate the copolymerization, thereby generating a product mixture with copolymer chains, whereby at least some of the copolymer chains have an alkoxyamine end group; depositing the product mixture on a substrate having surface bound norbornene silane molecules; and allowing at least some of the alkoxyamine end groups to react with at least some of the surface bound norbornene silane molecules, thereby forming a copolymer coating In an example of the second aspect, $R^{2'}$ is the azido; and the method further comprises curing the copolymer coating, whereby some of the azidos react with some other of the surface bound norbornene silane molecules.

In an example of the second aspect, $R^{2'}$ is the azido; and prior to the copolymerizing, the method further comprises generating the monomer of formula (III) by reacting a monomer of a formula (V):

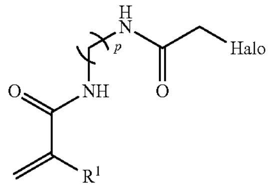

with $NaN_3$ to introduce the azido.

In an example of the second aspect, $R^{2'}$ is the halogen; and prior to the deposition of the product mixture, the method further comprises introducing $NaN_3$ to the product mixture and heating the product mixture to replace the halogen with the azido.

An example of the second aspect further comprises adding tetramethylethylenediamine to the reaction mixture, and wherein at least some of the copolymer chains are branched.

It is to be understood that any features of this method may be combined together in any desirable manner. Moreover, it is to be understood that any combination of features of this method and/or of the flow cell may be used together, and/or combined with any of the examples disclosed herein to achieve the benefits as described in this disclosure, including, for example, attachment of the copolymer coating to the substrate at room temperature.

A third aspect disclosed herein is a method comprising adding i) a nitroxide mediated polymerization unimolecular initiator or ii) a combination of a water soluble initiator and a nitroxide to a mixture of a monomer of formula (III):

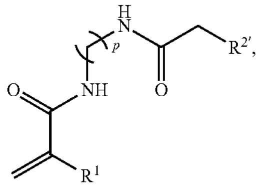

and monomer of formula (IV):

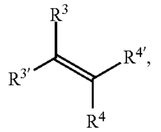

in the presence of a substrate having surface bound norbornene silane molecules, wherein: for formula (III): $R^1$ is selected from the group consisting of —H, a halogen, an alkyl, an alkoxy, an alkenyl, an alkynyl, a cycloalkyl, an aryl, a heteroaryl, a heterocycle, and optionally substituted variants thereof; $R^{2'}$ is an azido or a halogen; each $(CH_2)_p$ can be optionally substituted; and p is an integer from 1 to 50; and for formula (IV): each of $R^3$, $R^{3'}$, $R^4$, $R^{4'}$ is independently selected from the group consisting of —H, $R^5$, —$OR^5$, —C(O)$OR^5$, —C(O)$R^5$, —OC(O)$R^5$, —C(O)$NR^6R^7$, and —$NR^6R^7$; $R^5$ is selected from the group consisting of —H, —OH, an alkyl, a cycloalkyl, a hydroxyalkyl, an aryl, a heteroaryl, a heterocycle, and optionally substituted variants thereof; and each of $R^6$ and $R^7$ is independently selected from the group consisting of —H and an alkyl; thereby generating a copolymer coating covalently attached to the norbornene silane molecules.

In an example of the third aspect, $R^2$ is the azido; and the method further comprises curing the copolymer coating on the substrate, whereby some of the azidos react with some other of the surface bound norbornene silane molecules.

In an example of the third aspect, $R^{2'}$ is the azido; and prior to the copolymerizing, the method further comprises generating the monomer of formula (III) by reacting a monomer of a formula (V):

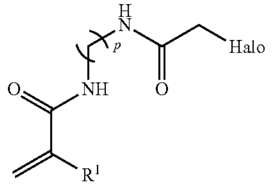

with $NaN_3$ to introduce the azido.

In an example of the third aspect, $R^{2'}$ is the halogen; and after the copolymerization, the method further comprises introducing $NaN_3$ to the copolymer coating and heating the copolymer coating to replace the halogen with the azido.

An example of the third aspect further comprises curing the copolymer coating on the substrate, whereby some of the azidos react with some other of the surface bound norbornene silane molecules.

An example of the third aspect further comprises adding tetramethylethylenediamine to the mixture during the copolymerization, and wherein at least some of the copolymer chains are branched.

It is to be understood that any features of this method may be combined together in any desirable manner. Moreover, it is to be understood that any combination of features of this method and/or of the other method and/or of the flow cell may be used together, and/or combined with any of the examples disclosed herein to achieve the benefits as described in this disclosure, including, for example, attachment of the copolymer coating to the substrate at room temperature.

A fourth aspect disclosed herein is a method comprising copolymerizing a reaction mixture of a monomer of formula (III):

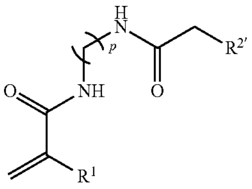

and an other monomer in the presence of i) a nitroxide mediated polymerization unimolecular initiator or ii) a combination of a water soluble initiator and a nitroxide, wherein: $R^1$ is selected from the group consisting of —H, a halogen, an alkyl, an alkoxy, an alkenyl, an alkynyl, a cycloalkyl, an aryl, a heteroaryl, a heterocycle, and optionally substituted variants thereof; $R^{2'}$ is an azido; each $(CH_2)_p$ can be optionally substituted; and p is an integer from 1 to 50; quenching the polymerization, thereby generating a first product mixture with block copolymer chains, whereby at least some of the block copolymer chains have an alkoxyamine end group; adding monomers of formula (IV):

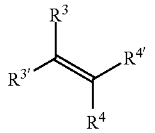

to the first product mixture to generate a second reaction mixture, wherein: each of $R^3$, $R^{3'}$, $R^4$, $R^{4'}$ is independently selected from the group consisting of —H, $R^5$, —$OR^5$, —$C(O)OR^5$, —$C(O)R^5$, —$OC(O)R^5$, —$C(O)NR^6R^7$, and —$NR^6R^7$; $R^5$ is selected from the group consisting of —H, —OH, an alkyl, a cycloalkyl, a hydroxyalkyl, an aryl, a heteroaryl, a heterocycle, and optionally substituted variants thereof; and each of $R^6$ and $R^7$ is independently selected from the group consisting of —H and an alkyl; polymerizing the second reaction mixture in the presence of the i) the nitroxide mediated polymerization unimolecular initiator or ii) the combination of the water soluble initiator and the nitroxide; quenching the polymerization, thereby generating a second product mixture with block copolymer chains, whereby at least some of the block copolymer chains have an alkoxyamine end group; depositing the second product mixture on a substrate having surface bound norbornene silane molecules; and reacting at least some of the alkoxyamine end groups with at least some of the surface bound norbornene silane molecules.

It is to be understood that any features of this method may be combined together in any desirable manner. Moreover, it is to be understood that any combination of features of this method and/or of the other methods and/or of the flow cell may be used together, and/or combined with any of the examples disclosed herein to achieve the benefits as described in this disclosure, including, for example, attachment of the copolymer coating to the substrate at room temperature.

A fifth aspect disclosed herein is a flow cell comprises a substrate and a copolymer coating attached to at least a portion of the substrate, the copolymer coating including a plurality of copolymer chains, wherein each copolymer chain includes: a first recurring unit of formula (I):

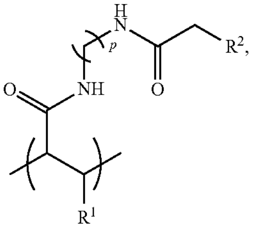

wherein: $R^1$ is selected from the group consisting of —H, a halogen, an alkyl, an alkoxy, an alkenyl, an alkynyl, a cycloalkyl, an aryl, a heteroaryl, a heterocycle, and optionally substituted variants thereof; $R^2$ is an azido; each $(CH_2)_p$ can be optionally substituted; and p is an integer from 1 to 50; a second recurring unit of formula (II):

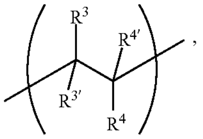

wherein: each of $R^3$, $R^{3'}$, $R^4$, $R^{4'}$ is independently selected from the group consisting of —H, $R^5$, —$OR^5$, —$C(O)OR^5$, —$C(O)R^5$, —$OC(O)R^5$, —$C(O)NR^6R^7$, and —$NR^6R^7$; $R^5$ is selected from the group consisting of —H, —OH, an alkyl, a cycloalkyl, a hydroxyalkyl, an aryl, a heteroaryl, a heterocycle, and optionally substituted variants thereof; and each of $R^6$ and $R^7$ is independently selected from the group consisting of —H and an alkyl; and a third recurring unit of formula (VI):

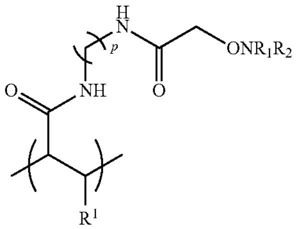

wherein: $R^1$ is selected from the group consisting of —H, a halogen, an alkyl, an alkoxy, an alkenyl, an alkynyl, a cycloalkyl, an aryl, a heteroaryl, a heterocycle, and optionally substituted variants thereof; $R_1$ and $R_2$ are independently selected from a carbon based substituent; each $(CH_2)_p$ can be optionally substituted; and p is an integer from 1 to 50.

In an example of the fifth aspect, at least some of the copolymer chains include at least one alkoxyamine end group.

It is to be understood that any features of this flow cell may be combined together in any desirable manner. Moreover, it is to be understood that any combination of features of this flow cell and/or of the other methods and/or of the other flow cell may be used together, and/or combined with any of the examples disclosed herein to achieve the benefits as described in this disclosure, including, for example, enhanced attachment of the copolymer coating to the flow cell substrate.

A sixth aspect disclosed herein is a method comprising adding i) a nitroxide mediated polymerization unimolecular initiator or ii) a combination of a water soluble initiator and a nitroxide to a mixture of a monomer of formula (V):

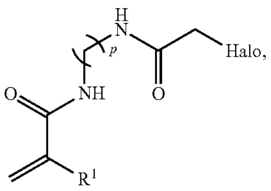

and monomer of formula (IV):

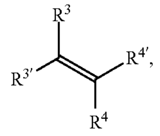

wherein: for formula (V): $R^1$ is selected from the group consisting of —H, a halogen, an alkyl, an alkoxy, an alkenyl, an alkynyl, a cycloalkyl, an aryl, a heteroaryl, a heterocycle, and optionally substituted variants thereof; halo is a halogen; each $(CH_2)_p$ can be optionally substituted; and p is an integer from 1 to 50; and for formula (IV): each of $R^3$, $R^{3'}$, $R^4$, $R^{4'}$ is independently selected from the group consisting of —H, $R^5$, —$OR^5$, —$C(O)OR^5$, —$C(O)R^5$, —$OC(O)R^5$, —$C(O)NR^6R^7$, and —$NR^6R^7$; $R^5$ is selected from the group consisting of —H, —OH, an alkyl, a cycloalkyl, a hydroxyalkyl, an aryl, a heteroaryl, a heterocycle, and optionally substituted variants thereof; and each of $R^6$ and $R^7$ is independently selected from the group consisting of —H and an alkyl; thereby generating a copolymer; and after the copolymerization, converting some of the halogens to alkoxyamines and some other of the halogens to azides.

In an example of sixth aspect, converting some of the halogens to alkoxyamines and some other of the halogens to azides involves: introducing a hydroxylamine to the copolymer so that the halogens are in excess of the hydroxylamine; heating the copolymer to initiate a reaction where the hydroxylamine displaces some of the halogens; introducing $NaN_3$ to the copolymer; and heating the copolymer to initiate a reaction where the azide displaces some other of the halogens.

In an example of sixth aspect, converting some of the halogens to hydroxyamines and some other of the halogens to azides involves: introducing a mixture of hydroxylamine and $NaN_3$ to the copolymer; and heating the copolymer to initiate a reactions where the hydroxylamine displaces some of the halogens and where the azide displaces some other of the halogens.

In an example of sixth aspect, converting some of the halogens to hydroxyamines and some other of the halogens to azides involves: deprotonating a hydroxylamine to form an alkoxyamine anion; introducing the alkoxyamine anion to the copolymer so that the halogens are in excess of the alkoxyamine anion; heating the copolymer to initiate a reaction where the alkoxyamine anion displaces some of the halogens; introducing $NaN_3$ to the copolymer; and heating the copolymer to initiate a reaction where the azide displaces some other of the halogens.

It is to be understood that any features of this method may be combined together in any desirable manner. Moreover, it is to be understood that any combination of features of this method and/or of the other methods and/or of the other flow cells may be used together, and/or combined with any of the examples disclosed herein to achieve the benefits as described in this disclosure, including, for example, enhanced attachment of the copolymer coating to the flow cell substrate.

BRIEF DESCRIPTION OF THE DRAWINGS

Features of examples of the present disclosure will become apparent by reference to the following detailed description and drawings, in which like reference numerals correspond to similar, though perhaps not identical, components. For the sake of brevity, reference numerals or features having a previously described function may or may not be described in connection with other drawings in which they appear.

DETAILED DESCRIPTION

Figure 1:
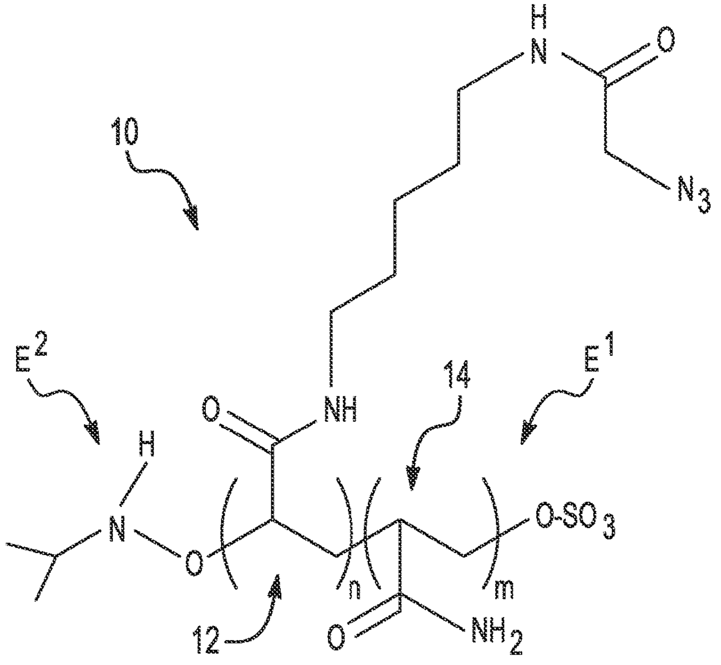
FIG. 1 is a schematic illustration of the chemical structure of one example of a copolymer disclosed herein.

A copolymer coating is disclosed herein. The copolymer coating includes copolymer chains, each of which includes a recurring acrylamide monomer having an azido group. The azido group is capable of attaching a primer, and thus the copolymer coating may be suitable to form reactive surface(s) in a flow cell.

During preparation of some examples of the copolymer chains, a nitroxide mediated polymerization unimolecular initiator (NMP unimolecular initiator) is used as the polymerization initiator and mediator, and in some instances as the polymerization quencher. The NMP unimolecular initiator thermally separates into two free radicals, one of which is a carbon centered radical that acts as the initiator of the free radical polymerization, and thus a separate free radical initiator may not be used. The other free radical is a nitroxide, a stable free radical, which controls the polymerization by reversibly terminating the polymerization. As such, at least some of the copolymer chains have an alkoxyamine end group. In the copolymer chain, the term "alkoxyamine end group" refers to the dormant species —$ONR_1R_2$, where each of $R_1$ and $R_2$ may be the same or different, and may independently be a linear or branched alkyl, or a ring structure, and where the oxygen atom is attached to the rest of the copolymer chain. The alkoxyamine end group may be thermally activated as described herein to generate the two free radicals. When the NMP unimolecular initiator is used in excess of the monomers, it can quench the polymerization reaction, and most, if not all, of the copolymer chains will have alkoxyamine end groups.

During preparation of some other examples of the copolymer chains, a water soluble initiator and a nitroxide are respectively used as the polymerization initiator and mediator. The water soluble initiator initiates the free radical polymerization, and the nitroxide controls the polymerization by reversibly terminating the polymerization. As such, at least some of the copolymer chains have the alkoxyamine end group.

During preparation of still some other examples of the copolymer chains, the alkoxyamine is introduced into some of the recurring acrylamide monomers instead of the azido group. This introduces the alkoxyamine into the side chains along the polymer backbone, which may result in more attachment sites to a flow cell substrate and improved stability of the co-polymer.

The present inventors have unexpectedly found that the alkoxyamine at the end group(s) and/or in the side chain of the copolymers disclosed herein remain intact and active even after the copolymer has been stored, for example, for at least 6 months. Moreover, the inventors have found that the alkoxyamine end group or alkoxyamine in the side chain provides an attachment mechanism to a silanized based support, in particular to norbornene silane molecules. This attachment mechanism may take place simultaneously with an azide-norbornene attachment. The additional attachment mechanism through the alkoxyamine may free up some azide groups for primer attachment, which may result in more primers on the surface and thus improved sequencing metrics. Increased alkoxyamine-norbornene attachment may also increase the stability of the co-polymer.

Definitions

It is to be understood that terms used herein will take on their ordinary meaning in the relevant art unless specified otherwise. Several terms used herein and their meanings are set forth below.

The singular forms "a", "an", and "the" include plural referents unless the context clearly dictates otherwise.

The terms comprising, including, containing and various forms of these terms are synonymous with each other and are meant to be equally broad.

The terms top, bottom, lower, upper, on, etc. are used herein to describe the flow cell and/or the various components of the flow cell. It is to be understood that these directional terms are not meant to imply a specific orientation, but are used to designate relative orientation between components. The use of directional terms should not be interpreted to limit the examples disclosed herein to any specific orientation(s).

Any numerical ranges provided herein are inclusive of the end numbers, unless specifically stated otherwise.

An "acrylamide" is a monomer with the structure

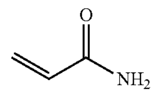

or a monomer including the acrylamide group. Examples of the monomer including an acrylamide group include azido acetamido pentyl acrylamide:

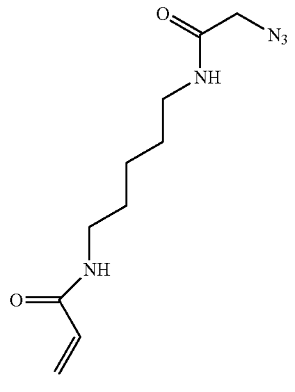 [SMILES: C=CC(=O)NCCCCCNC(=O)CN=[N+]=[N-]]

and N-isopropylacrylamide:

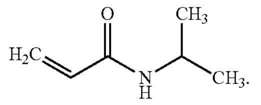

Other acrylamide monomers may be used. In the example copolymers disclosed herein, an acrylamide monomer is the precursor unit to the first recurring unit of formula (I). In some examples, a different acrylamide monomer is the precursor unit to the second recurring unit of formula (II).

As used herein, "alkyl" refers to a straight or branched hydrocarbon chain that is fully saturated (i.e., contains no double or triple bonds). The alkyl group may have 1 to 20 carbon atoms. Example alkyl groups include methyl, ethyl, propyl, isopropyl, butyl, isobutyl, tertiary butyl, pentyl, hexyl, and the like. As an example, the designation "C1-C6 alkyl" indicates that there are one (1) to six (6) carbon atoms in the alkyl chain, i.e., the alkyl chain is selected from the group consisting of methyl, ethyl, propyl, iso-propyl, n-butyl, isobutyl, sec-butyl, t-butyl, pentyl, and hexyl. Any alkyl may be substituted or unsubstituted.

As used herein, "alkenyl" refers to a straight or branched hydrocarbon chain containing one or more double bonds. The alkenyl group has 2 to 20 carbon atoms. Example alkenyl groups include ethenyl, propenyl, butenyl, pentenyl, hexenyl, and the like. Any alkenyl may be substituted or unsubstituted.

An "alkoxy" group refers to the formula —OR, wherein R is an alkyl, an alkenyl, an alkynyl, a cycloalkyl, a cycloalkenyl or a cycloalkynyl as defined herein. Some example alkoxy groups include methoxy, ethoxy, n-propoxy, 1-methylethoxy (isopropoxy), n-butoxy, iso-butoxy, sec-butoxy, and tert-butoxy. Any alkoxy may be substituted or unsubstituted.

As mentioned above, the terms "alkoxyamine" and "alkoxyamine end group" refers to the dormant species —$ONR_1R_2$, where each of $R_1$ and $R_2$ may be the same or different, and may independently be a carbon based group, such as a linear or branched alkyl, or a ring structure. The oxygen atom is attached to the rest of the copolymer chain in the side chains(s) or as an end group. The alkoxyamine end group in the copolymer chain can separate to form an unbonded free radical, enabling the copolymer to undergo further reaction. The unbonded free radical is a nitroxide free radical having the structure:

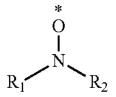

(where each of $R_1$ and $R_2$ is a carbon based group, such as a linear or branched alkyl, or a ring structure).

As used herein, "alkyne" or "alkynyl" refers to a straight or branched hydrocarbon chain containing one or more triple bonds. The alkynyl group may have 2 to 20 carbon atoms. Any alkynyl may be substituted or unsubstituted.

The term "aryl" refers to an aromatic ring or ring system (i.e., two or more fused rings that share two adjacent carbon atoms) containing only carbon in the ring backbone. When the aryl is a ring system, every ring in the system is aromatic. The aryl group may have 6 to 18 carbon atoms. Examples of aryl groups include phenyl, naphthyl, azulenyl, and anthracenyl. Any aryl may be a "heteroaryl," with at least one heteroatom, that is, an element other than carbon (e.g., nitrogen, oxygen, sulfur, etc.), in ring backbone. Any aryl group may be substituted or unsubstituted.

As used herein, the term "attached" refers to the state of two things being joined, fastened, adhered, connected or bound to each other, either directly or indirectly. Some attachments may be by a covalent bond or a non-covalent bond. A covalent bond is characterized by the sharing of pairs of electrons between atoms. A non-covalent bond is a physical bond that does not involve the sharing of pairs of electrons and can include, for example, hydrogen bonds, ionic bonds, van der Waals forces, hydrophilic interactions and hydrophobic interactions.

An "azide" or "azido" functional group refers to —$N_3$.

A "block copolymer" is a copolymer formed when two or more monomers cluster together and form blocks of repeating units. Each block should have at least one feature which is/are not present in adjacent blocks. Specific examples of block copolymers will be described further below.

As used herein, "cycloalkyl" refers to a completely saturated (no double or triple bonds) mono- or multi-cyclic hydrocarbon ring system. When composed of two or more rings, the rings may be joined together in a fused fashion. Cycloalkyl groups can contain 3 to 10 atoms in the ring(s). In some examples, cycloalkyl groups can contain 3 to 8 atoms in the ring(s). A cycloalkyl group may be unsubstituted or substituted. Example cycloalkyl groups include cyclopropyl, cyclobutyl, cyclopentyl, cyclohexyl, cycloheptyl, and cyclooctyl.

As used herein, "cycloalkenyl" or "cycloalkene" means a carbocycle ring or ring system having at least one double bond, wherein no ring in the ring system is aromatic. Examples include cyclohexenyl or cyclohexene and norbornenyl or norbornene.

As used herein, "cycloalkynyl" or "cycloalkyne" means a carbocycle ring or ring system having at least one triple bond, wherein no ring in the ring system is aromatic. An example is cyclooctyne. Another example is bicyclononyne.

The term "depositing," as used herein, refers to any suitable application technique, which may be manual or automated, and, in some instances, results in modification of the surface properties. Generally, depositing may be performed using vapor deposition techniques, coating techniques, grafting techniques, or the like. Some specific examples include chemical vapor deposition (CVD), spray coating (e.g., ultrasonic spray coating), spin coating, dunk or dip coating, doctor blade coating, puddle dispensing, flow through coating, aerosol printing, screen printing, microcontact printing, inkjet printing, or the like.

As used herein, the term "depression" refers to a discrete concave feature in a base support or a layer of a multi-layer stack having a surface opening that is at least partially surrounded by interstitial region(s) of the base support or a layer of a multi-layer stack. Depressions can have any of a variety of shapes at their opening in a surface including, as examples, round, elliptical, square, polygonal, star shaped (with any number of vertices), etc. The cross-section of a depression taken orthogonally with the surface can be curved, square, polygonal, hyperbolic, conical, angular, etc. As examples, the depression can be a well or two interconnected wells. The depression may also have more complex architectures, such as ridges, step features, etc.

The term "each," when used in reference to a collection of items, is intended to identify an individual item in the collection, but does not necessarily refer to every item in the collection. Exceptions can occur if explicit disclosure or context clearly dictates otherwise.

As used herein, the term "flow cell" is intended to mean a vessel having a flow channel where a reaction can be carried out, an inlet for delivering reagent(s) to the flow channel, and an outlet for removing reagent(s) from the flow channel. In some examples, the flow cell accommodates the detection of the reaction that occurs in the flow cell. For example, the flow cell can include one or more transparent surfaces allowing for the optical detection of arrays, optically labeled molecules, or the like.

As used herein, a "flow channel" or "channel" may be an area defined between two bonded components, which can selectively receive a liquid sample. In some examples, the flow channel may be defined between a patterned or non-patterned substrate and a lid. In other examples, the flow channel may be defined between two patterned or non-patterned substrates that are bonded together. The flow channel is in fluid communication with surface chemistry of the patterned or non-patterned substrates.

A "halogen" or "halo" refers to any one of the radio-stable atoms of column 7 of the period table of the elements, such as bromine, chloride, fluorine, and iodine.

As used herein, "heterocycle" means a non-aromatic cyclic ring or ring system containing at least one heteroatom in the ring backbone. Heterocycles may be joined together in a fused, bridged or spiro-connected fashion. Heterocycles may have any degree of saturation provided that at least one ring in the ring system is not aromatic. In the ring system, the heteroatom(s) may be present in either a non-aromatic or aromatic ring. The heterocycle may have 3 to 20 ring members (i.e., the number of atoms making up the ring backbone, including carbon atoms and heteroatoms). In some examples, the heteroatom(s) are O, N, or S.

As used herein, "hydroxy" or "hydroxyl" refers to an —OH group.

As used herein, the term "interstitial region" refers to an area, e.g., of a substrate, patterned resin, or other support that separates depressions or pads. For example, an interstitial region can separate one depression or pad of an array from another depression or pad of the array. The two depressions or pads that are separated from each other can be discrete, i.e., lacking physical contact with each other. In many examples, the interstitial region is continuous whereas the depressions or pads are discrete, for example, as is the case for a plurality of depressions or pads defined in an otherwise continuous surface. In other examples, the interstitial regions and the features are discrete, for example, as is the case for a plurality of elongated depressions (e.g., trenches) separated by respective interstitial regions. The separation provided by an interstitial region can be partial or full separation. Interstitial regions may have a surface material that differs from the surface material of the depressions defined in the surface.

The term “hydroxyalkyl” refers to an alkyl group in which one or more of the hydrogen atoms are replaced by a hydroxy group. Example hydroxyalkyl groups include 2-hydroxyethyl, 3-hydroxypropyl, 2-hydroxypropyl, and 2,2-dihydroxyethyl. A hydroxyalkyl may be substituted or unsubstituted.

The term “hydroxylamine” refers to $HONR_1R_2$, where each of $R_1$ and $R_2$ may be the same or different, and may independently be a linear or branched alkyl, or a ring structure, and where the oxygen atom is attached to the rest of the copolymer chain.

As used herein, a “nucleotide” includes a nitrogen containing heterocyclic base, a sugar, and one or more phosphate groups. Nucleotides are monomeric units of a nucleic acid sequence. In RNA, the sugar is a ribose, and in DNA, the sugar is a deoxyribose, i.e. a sugar lacking a hydroxyl group that is present at the 2' position in ribose. The nitrogen containing heterocyclic base (i.e., nucleobase) can be a purine base or a pyrimidine base. Purine bases include adenine (A) and guanine (G), and modified derivatives or analogs thereof. Pyrimidine bases include cytosine (C), thymine (T), and uracil (U), and modified derivatives or analogs thereof. The C-1 atom of deoxyribose is bonded to N-1 of a pyrimidine or N-9 of a purine. A nucleic acid analog may have any of the phosphate backbone, the sugar, or the nucleobase altered. Examples of nucleic acid analogs include, for example, universal bases or phosphate-sugar backbone analogs, such as peptide nucleic acid (PNA).

As used herein, the “primer” is defined as a single stranded nucleic acid sequence (e.g., single strand DNA). Some primers, sometimes referred to as capture or amplification primers, serve as a starting point for template amplification and cluster generation. Other primers, referred to herein as sequencing primers, serve as a starting point for DNA synthesis. The 5' terminus of the primer may be modified to allow a coupling reaction with a functional group (e.g., an azido) of the copolymer disclosed herein. The primer length can be any number of bases long and can include a variety of non-natural nucleotides. In an example, the sequencing primer is a short strand, ranging from 10 to 60 bases, or from 20 to 40 bases.

The term “substrate” refers to the single layer base support or a multi-layer structure upon which surface chemistry is introduced.

“Surface chemistry” refers to examples of the copolymer described herein and any primers attached thereto. The surface chemistry creates a reactive surface(s) on the substrate.

Copolymer

The copolymer chains disclosed herein include at least two different recurring units. In some examples, the copolymer chains include three different recurring units. All of the chains include two end groups, and in some examples, at least one end group is an alkoxyamine end group. In other examples, at least some of the recurring units include an alkoxyamine in the side chain.

Each copolymer chain includes a first recurring unit of formula (I):

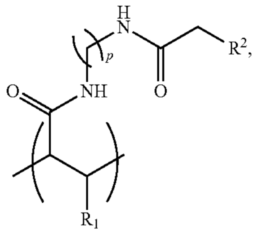

wherein $R^1$ is selected from the group consisting of —H, a halogen, an alkyl, an alkoxy, an alkenyl, an alkynyl, a cycloalkyl, an aryl, a heteroaryl, a heterocycle, and optionally substituted variants thereof; $R^2$ is an azido; each $(CH_2)_p$ can be optionally substituted; and p is an integer from 1 to 50; and a second recurring unit of formula (II):

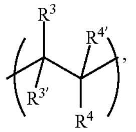

wherein each of $R^3$, $R^{3'}$, $R^4$, $R^{4'}$ is independently selected from the group consisting of —H, $R^5$, —$OR^5$, —$C(O)OR^5$, —$C(O)R^5$, —$OC(O)R^5$, —$C(O)NR^6R^7$, and —$NR^6R^7$; $R^5$ is selected from the group consisting of —H, —OH, an alkyl, a cycloalkyl, a hydroxyalkyl, an aryl, a heteroaryl, a heterocycle, and optionally substituted variants thereof; and each of $R^6$ and $R^7$ is independently selected from the group consisting of —H and an alkyl.

Some example copolymer chains also include a third recurring unit of formula (VI):

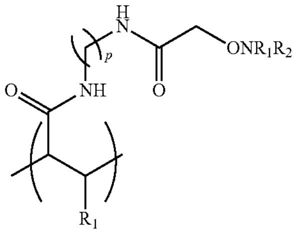

wherein $R^1$ is selected from the group consisting of —H, a halogen, an alkyl, an alkoxy, an alkenyl, an alkynyl, a cycloalkyl, an aryl, a heteroaryl, a heterocycle, and optionally substituted variants thereof; halo is a halogen; each $(CH_2)_p$ can be optionally substituted; and p is an integer from 1 to 50.

In one example of the recurring unit of formula (I), $R^1$ is —H, and p is 5.

In one example of the recurring unit of formula (II), each of $R^{3'}$, $R^4$, and $R^{4'}$ is —H; $R^3$ is —$C(O)NR^6R^7$; and each of $R^6$ and $R^7$ is —H. In another example of the recurring unit of formula (II), each of $R^{3'}$, $R^4$, and $R^{4'}$ is —H; $R^3$ is —C(O)N$R^6R^7$; and each of $R^6$ and $R^7$ is —$CH_3$. In still another example of the recurring unit of formula (II), each of $R^{3'}$, $R^4$, and $R^{4'}$ is —H; $R^3$ is —C(O)N$R^6R^7$; and $R^6$ is —H and $R^7$ is —$CH_3$. In yet another example of the recurring unit of formula (II), each of $R^{3'}$, $R^4$, and $R^{4'}$ is —H; $R^3$ is —C(O)N$R^6R^7$; and $R^6$ is —H and $R^7$ is —$(CH_2)_2OH$. In another example of the recurring unit of formula (II), each of $R^{3'}$, $R^4$, and $R^{4'}$ is —H; $R^3$ is —C(O)N$R^6R^7$; and $R^6$ is —$CH_3$ and $R^7$ is —$(CH_2)_2OH$. In yet other examples of the recurring unit of formula (II), each of $R^{3'}$, $R^4$, and $R^{4'}$ is —H; $R^3$ is —C(O)O$R^5$, and $R^5$ is —H, —$CH_3$, or —$(CH_2)_2OH$.

In one example of the recurring unit of formula (VI), $R^1$ is —H, halo is bromine, and p is 5.

In some examples, at least some of the copolymer chains also include a first end group selected from the group consisting of a hydroxyl, —$OSO_3$, an alkyl having from about 1 carbon atom to about 12 carbon atoms, and an alkoxyamine end group; and a second end group which is an alkoxyamine end group. The first end group may be controlled through selection of the initiator, and the second end group may be controlled through the mediator, which can quench the polymerization reaction. Example initiators and mediators are discussed below.

FIG. 1 depicts an example of the copolymer 10. In this example of the copolymer 10, an example of the recurring unit of formula (I) is shown at reference numeral 12, and an example of the recurring unit of formula (II) is shown at reference numeral 14. In this particular example, $R^1$ in the recurring unit 12 of formula (I) is —H and p in the recurring unit 12 of formula (I) is 5. Also in this particular example, each of $R^{3'}$, $R^4$, and $R^{4'}$ in the recurring unit 14 of formula (II) is —H and $R^3$ in the recurring unit 14 of formula (II) is —C(O)$NH_2$. While specific examples of the recurring units 12, 14 are shown, it is to be understood that any example of the recurring units 12, 14 of formulas (I) and (II) may be included in the copolymer 10.

In the example shown in FIG. 1, the first end group $E^1$ of the copolymer 10 is —$OSO_3$, and the alkoxyamine end group $E^2$ of the copolymer 10 is —O—NH—C$(CH_3)_2$. While a specific example of the first end group $E^1$ is shown, it is to be understood that any example of the end group $E^1$ may be included in the copolymer 10. While a specific example of the alkoxyamine end group $E^2$ is shown, it is to be understood that any alkoxyamine that can reversibly terminate the copolymer chain during synthesis may be incorporated in the copolymer 10.

In this example copolymer 10, "n" (the number of recurring unit of formula (I)) ranges from 2 to 50,000, and "m" (the number of recurring unit of formula (II)) ranges from 2 to 100,000. FIG. 1 depicts the individual units in block. It is to be understood, however, that the incorporation of the individual units may be statistical, random, or in block, and may depend upon the method used to synthesize the copolymer 10.

Figure 2:
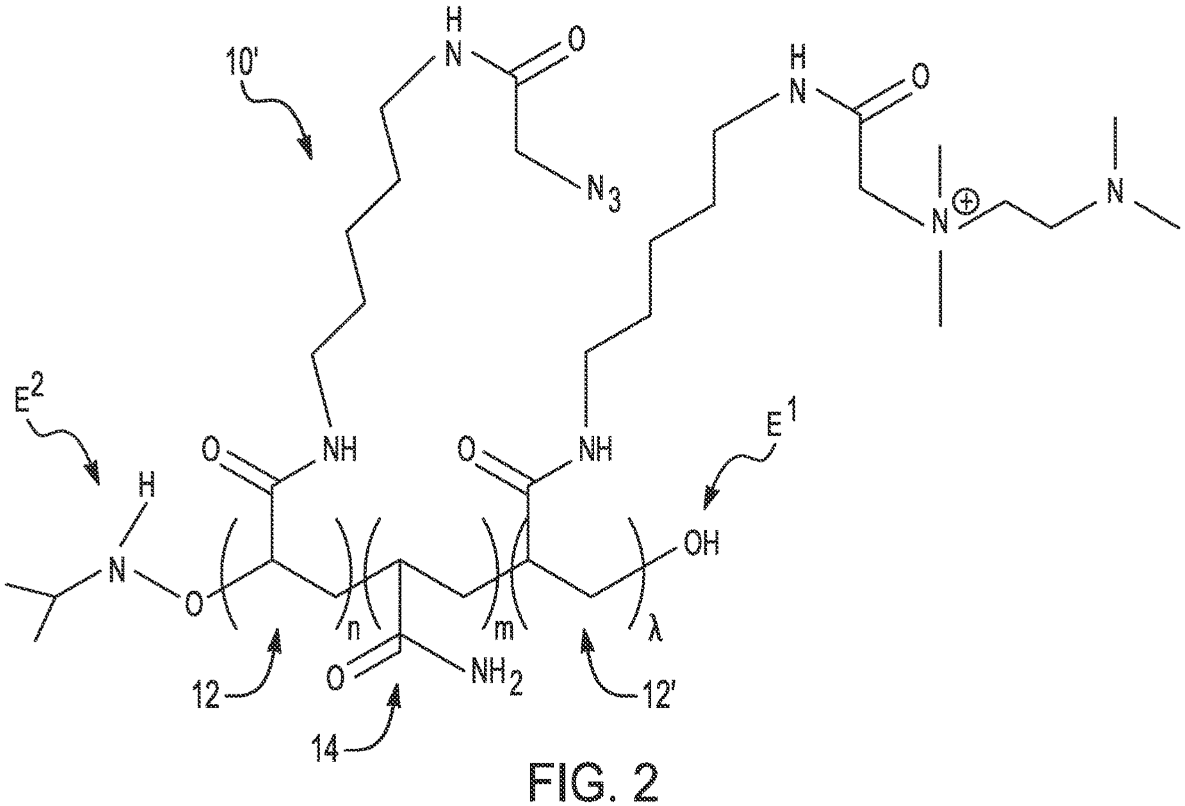
FIG. 2 is a schematic illustration of the chemical structure of another example of the copolymer disclosed herein.

Referring now to FIG. 2, another example of the copolymer is shown at reference numeral 10'. In this example, the copolymer 10' includes another recurring unit 12'. The recurring unit 12' is the product of a side reaction that may occur between the recurring unit 12 of formula (1) and tetramethylethylenediamine (TeMED). TeMED is a reaction promoter that may be introduced during copolymerization. As a result of the side reaction, TeMED replaces some of the azide ($N_3$) groups. As such, in some examples, $R^2$ of some of the copolymer chains is replaced with tetramethylethylenediamine. While this reaction reduces the azide content of these copolymer chains, it also introduces a branching site.

The branching sites may provide a location where the copolymer chains can branch to one other. As such, in some examples, a coating including the copolymer 10' includes some branched copolymer chains. When TeMED is used in the synthesis shown in FIG. 5, cross-linking may occur between the two nitrogens on TeMED and the halogen of the intermediate copolymer 16.

In this particular example, $R^1$ in the recurring units 12 and 12' is —H and p in the recurring units 12, 12' is 5. Also in this particular example, each of $R^{3'}$, $R^4$, and $R^{4'}$ in the recurring unit 14 of formula (II) is —H and $R^3$ in the recurring unit 14 of formula (II) is —C(O)$NH_2$. While specific examples of the recurring units 12, 12' 14 are shown, it is to be understood that any example of the recurring units 12, 14 of formulas (I) and (II) and of the recurring unit 12' may be included in the copolymer 10'.

In the example shown in FIG. 2, the first end group $E^1$ of the copolymer 10' is —OH, and the alkoxyamine end group $E^2$ of the copolymer 10 is —O—NH—C$(CH_3)_2$. While a specific example of the first end group $E^1$ is shown, it is to be understood that any example of the end group $E^1$ may be included in the copolymer 10'. While a specific example of the alkoxyamine end group $E^2$ is shown, it is to be understood that any alkoxyamine that can reversibly terminate the copolymer chain during synthesis may be incorporated in the copolymer 10'.

In this example copolymer 10', "n"+"λ" is an integer ranging from 2 to 50,000, and "m" is an integer ranging from 2 to 100,000. FIG. 2 depicts the individual units in block. It is to be understood, however, the incorporation of the individual units may be statistical, random, or in block, and may depend upon the method used to synthesize the copolymer 10'.

Figure 3:
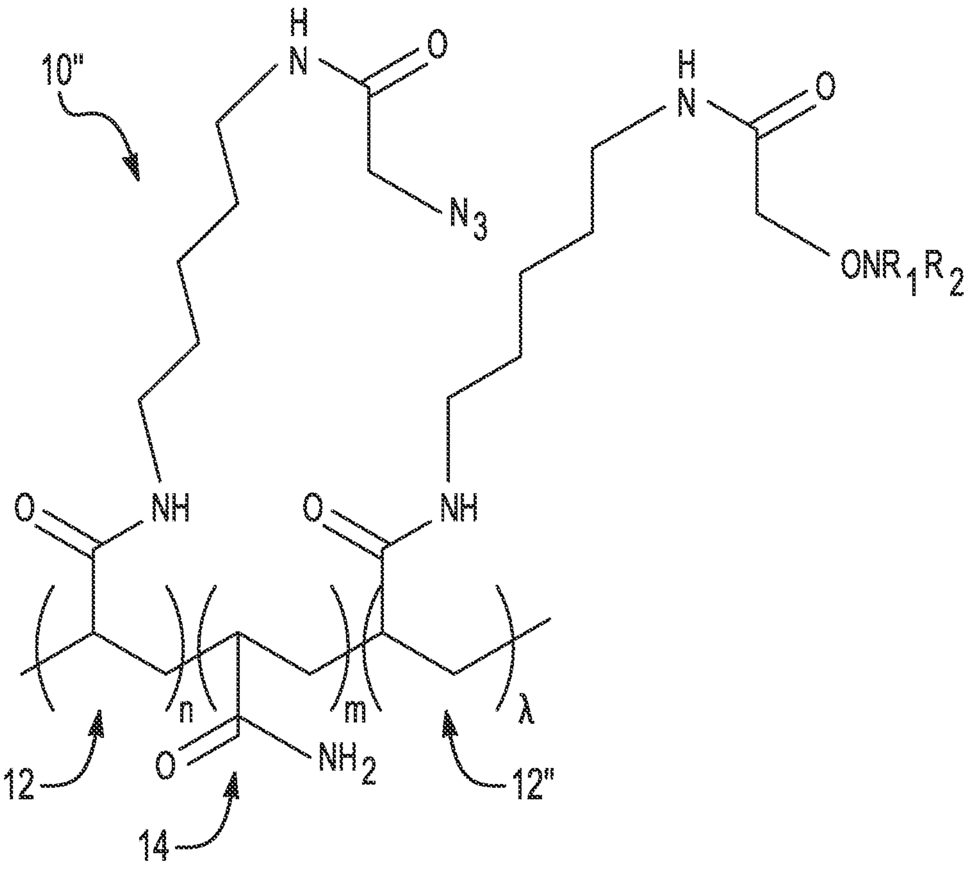
FIG. 3 is a schematic illustration of the chemical structure of another example of the copolymer disclosed herein.

Referring now to FIG. 3, still another example of the copolymer is shown at reference numeral 10". In this example, the copolymer 10" includes the recurring units of formula (I) and (II), as well another recurring unit 12" of formula (VI). The recurring unit 12" is the product of an alternate reaction that may occur between the monomer used to form the recurring unit (I) and a hydroxylamine or an alkoxyamine anion added after polymerization. As a result of the alternate reaction, an alkoxyamine (—O$NR_1R_2$) is present in some of the side chains instead of the azide ($N_3$) groups.

In this particular example, $R^1$ in the recurring units 12, 12" is —H and p is 5. Also in this particular example, each of $R^{3'}$, $R^4$, and $R^{4'}$ in the recurring unit 14 is —H and $R^3$ in the recurring unit 14 is —C(O)$NH_2$. Also this particular example, $R_1$ and $R_2$ in the recurring unit 12" is any carbon based substituent. While specific examples of the recurring units 12, 12", 14 are shown, it is to be understood that any example of the recurring units 12, 14 of formulas (I) and (II) and the recurring unit 12" may be included in the copolymer 10".

The ends groups in this example of the copolymer 10" may be any examples of the end groups set forth herein, and will depend upon the initiator and the mediator used in the copolymerization method.

In this example copolymer 10", "n"+"λ" is an integer ranging from 2 to 50,000, and "m" is an integer ranging from 2 to 100,000. FIG. 3 depicts the individual units in block. It is to be understood, however, that the incorporation of the individual units may be statistical, random, or in block, and may depend upon the method used to synthesize the copolymer 10".

The molecular weight of any example of the copolymer 10, 10', 10" may range from about 5 kDa to about 1500 kDa or from about 10 kDa to about 1000 kDa, or may be, in a specific example, about 500 kDa.

Methods of Making the Copolymer

Each of the methods for making examples of the copolymer 10, 10', 10" disclosed herein involves nitroxide mediated controlled free radical polymerization. Some of the polymerization processes involve NMP unimolecular initiators mediators to control free radical polymerization with reversible termination. Other examples of the polymerization processes involve nitroxide mediators to control free radical polymerization with reversible termination. During synthesis, the copolymer is considered a "living polymer." The alkoxyamine is retained at one end of the growing chain, and thus it can be separated to form a free radical (an active nitroxide species). Free radical generation may be controlled using temperature. The growing polymer chain can add one or more monomer units until the chain is again reversibly terminated by the alkoxyamine.

The monomers used to generate the copolymers 10, 10', 10" include carbon-carbon double bonds, which are capable of undergoing free-radical polymerization.

In any of the methods described herein, the monomers of formula (III) may be used to generate the recurring unit 12, 12'. Formula (III) is:

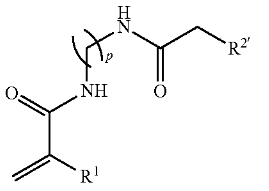

wherein $R^1$ is selected from the group consisting of —H, a halogen, an alkyl, an alkoxy, an alkenyl, an alkynyl, a cycloalkyl, an aryl, a heteroaryl, a heterocycle, and optionally substituted variants thereof; $R^{2'}$ is an azido or a halogen; each $(CH_2)_p$ can be optionally substituted; and p is an integer from 1 to 50.

The monomer of formula (III) with the azido group as $R^{2'}$ may be obtained from the monomer of formula (III) with the halogen as $R^{2'}$. In some examples, prior to copolymerizing the monomer of formula (III) with the monomer of formula (IV), the method may involve generating the monomer of formula (III) (with $R^{2'}$=azido) by reacting a monomer of formula (V):

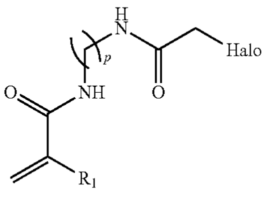

(e.g., where the halo is Br) with an excess of $NaN_3$ to introduce the azido group in place of the halogen. In one example, the $NaN_3$ is present at a 50-fold excess relative to the monomer of formula (V). The monomer of formula (V) may also be used during copolymer 10" synthesis to generate both the recurring unit 12 and the recurring unit 12".

In any of the methods described herein, the monomers of formula (IV) may be used generate the recurring unit 14 of formula (II). Formula (IV) is:

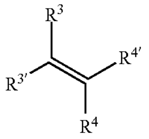

wherein each of $R^3$, $R^{3'}$, $R^4$, $R^{4'}$ is independently selected from the group consisting of —H, $R^5$, —$OR^5$, —$C(O)OR^5$, —$C(O)R^5$, —$OC(O)R^5$, —$C(O)NR^6R^7$, and —$NR^6R^7$; $R^5$ is selected from the group consisting of —H, —OH, an alkyl, a cycloalkyl, a hydroxyalkyl, an aryl, a heteroaryl, a heterocycle, and optionally substituted variants thereof; and each of $R^6$ and $R^7$ is independently selected from the group consisting of —H and an alkyl.

In some of the methods described herein, a nitroxide mediated polymerization unimolecular initiator may be used. As examples, the NMP unimolecular initiator has a structure selected from the group consisting of:

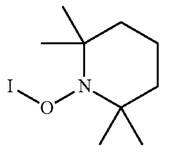

(2,2,6,6-Tetramethylpiperidinyloxy (TEMPO)),

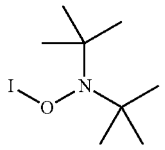

(di-tert-butyl nitroxide),

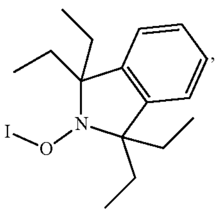

,

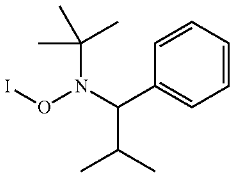

(2,2,5-Trimethyl-4-phenyl-3-azahexane-3-nitroxide), and

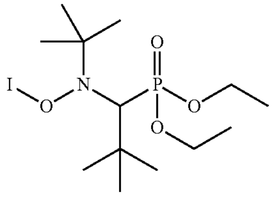 [SMILES: CCOP(=O)(OCC)C(N(OI)C(C)(C)C)C(C)(C)C]

(β-phosphonylated nitroxide (SG1); where I is selected from the group consisting of

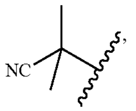
,
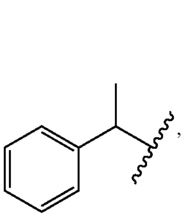
, and
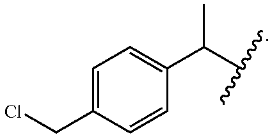
.

In these examples, "I" does not represent the element iodine. These NMP unimolecular initiators may be added to initiate polymerization.

In other examples of the methods described herein, a water soluble radical initiator, such as potassium persulfate, 4,4'-Azobis(4-cyanovaleric acid), etc., and a nitroxide are used in combination. Any of the previously listed nitroxides may be used in radical form, i.e., without the "I" group.

As mentioned herein, the incorporation of the individual units 12, 14 or 12, 14, 12' or 12, 14, 12" along the copolymer chains may be statistical, random, or in block.

Statistical copolymers (e.g., sequential distribution of the monomeric units obeys known statistical laws) and random copolymers (e.g., monomers are randomly introduced along the copolymer chain and may result in some blocks of the recurring unit 12, or 12 and 12', or 12 and 12" and some blocks of the recurring unit 14) may be prepared in a one-pot synthesis. In a one-pot synthesis, the monomers of formula (III) are mixed with monomers of formula (IV), and copolymerization is carried out in the presence of the NMP unimolecular initiator or the combination of the water soluble initiator and the nitroxide under conditions suitable for the monomers being used, the initiator or initiator and mediator combination, and the desired product (including its molecular weight).

Figure 4:
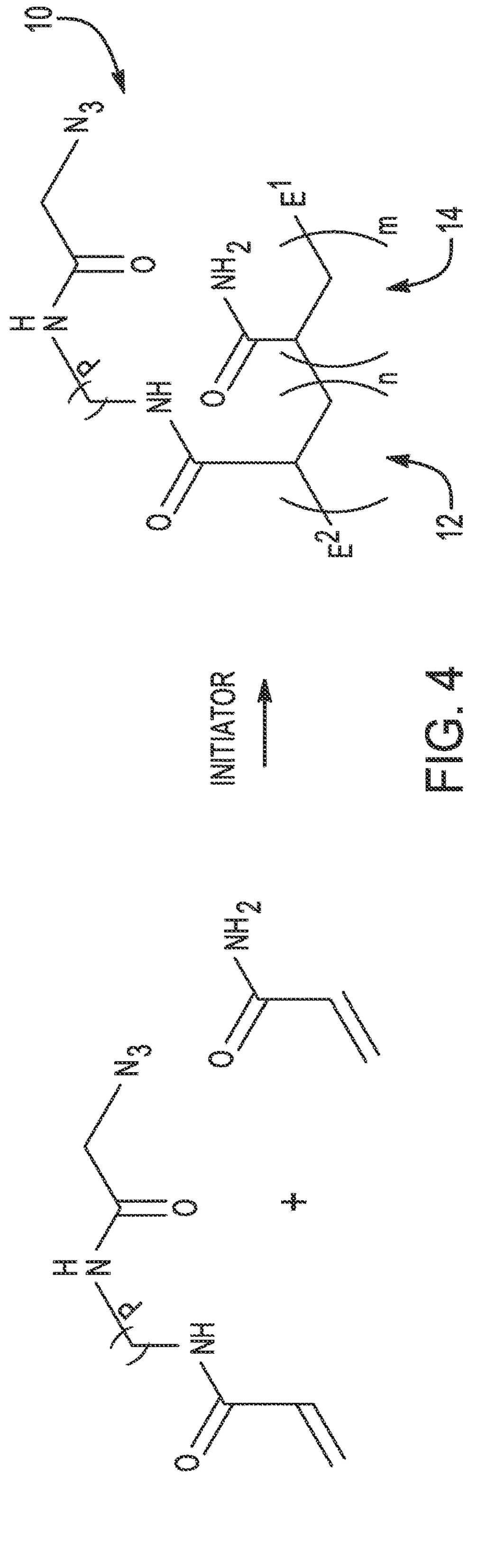
FIG. 4 is a schematic illustration of one example of a chemical reaction to form one example of the copolymer disclosed herein.

An example of the one-pot synthesis is shown schematically in FIG. 4. In this example, the monomer of formula (III) includes an azido group as $R^{2'}$, and the monomer of formula (IV) includes —H as each of $R^{3'}$, $R^4$, and $R^{4'}$ and $C(O)NH_2$ as $R^3$.

For the one-pot synthesis shown in FIG. 4, the reaction mixture includes the monomers of formula (III) (azido group as $R^{2'}$), the monomers of formula (IV), and the NMP unimolecular initiator or the combination of the water soluble initiator and the nitroxide. The monomers of formula (III) and formula (IV) may be present in a suitable weight ratio with respect to one another such that the desirable number of respective recurring units 12, 14 is introduced into the resulting copolymer 10. The NMP unimolecular initiator or the combination of the water soluble initiator and the nitroxide may be present in an amount that enables all of the monomers in the reaction mixture to copolymerize. In one example, the NMP unimolecular initiator or the combination of the water soluble initiator and the nitroxide may make up from about 0.005 wt % to about 5 wt % of the reaction mixture.

The reaction mixture may also include water, a solvent, or a combination of water with the solvent. Example solvents include N-methyl-2-pyrollidone (NMP), dimethyl formamide (DMF), dimethyl sulfoxide (DMSO), acetonitrile (MeCN), methanol (MeOH), ethanol (EtOH), isopropyl alcohol (IPA), dioxane, acetone, dimethylacetamide (DMAc), or the like. The mixture may also include a buffer to at least substantially prevent undesirable changes in the pH. The pH of the reaction mixture may be acidic (<7). Examples of suitable buffers include TRIS (tris(hydroxymethyl)aminomethane or TRIZMA®), Bis-tris methane buffer, ADA buffer (a zwitterionic buffering agent), MES (2-ethanesulfonic acid), MOPS (3-(N-morpholino)propanesulfonic acid), or another acidic buffer.

As mentioned, the copolymerization is carried out in the presence of the initiator or initiator and mediator under suitable conditions. As an example, the temperature may range from about room temperature (e.g., 18° C.-25° C.) to about 150° C., and will depend upon the solvent, monomer, and choice of NMP unimolecular initiator or nitroxide. For example, when alone water is used, the temperature may be 90° C. or less. When a solvent or a combination of water and solvent is used, higher temperatures may be used. Some other example temperature ranges include from about 18° C. to about 130° C., from about 50° C. to about 75° C., etc. The time for the polymerization reaction may range from about 5 minutes to about 24 hours, e.g., 1 hour to 10 hours.

The temperature may be set so that the growing copolymer chain can continuously add the monomer units of formula (III) and formula (IV). In one example, an excess of the NMP unimolecular initiator or the combination of the water soluble initiator and the nitroxide may be included in the reaction mixture and when all of the monomers have reacted, the temperature may be allowed to drop and the nitroxide free radicals will quench polymerization and attach as the copolymer chain end groups $E^2$. In another example, additional NMP unimolecular initiator or nitroxide may be added to the reaction mixture to quench polymerization. Quenching the copolymerization generates a product mixture with copolymer chains, where at least some of the copolymer chains have an alkoxyamine end group $E^2$.

While not shown, it is to be understood that the example method described in reference to FIG. 4 may also involve tetramethylethylenediamine in order to form an example of the copolymer 10' shown in FIG. 2. This example method involves adding the tetramethylethylenediamine to the reaction mixture. The TeMED may be added prior to the initiation of copolymerization or as copolymerization is taking place. As shown in FIG. 2, at least some of the azide groups are replaced with TeMED, which provides a branching site in the copolymer chain 10'. In this example method, at least some of the copolymer chains 10' branch with each other.

Figure 5:
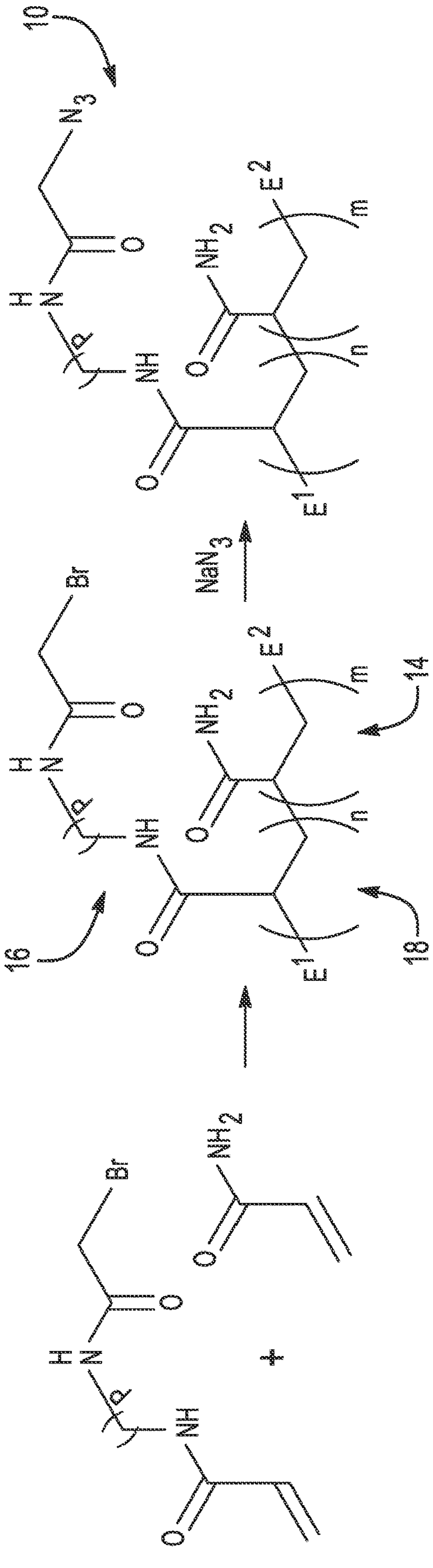
FIG. 5 is a schematic illustration of another example of a chemical reaction to form one example of the copolymer disclosed herein.

Another example of the one-pot synthesis is shown schematically in FIG. 5. In this example, the monomer of formula (III) includes a halogen (specifically Br) as $R^{2'}$, and the monomer of formula (IV) includes —H as each of $R^{3'}$, $R^4$, and $R^{4'}$ and $C(O)NH_2$ as $R^3$.

For this example of the one-pot synthesis, the reaction mixture may be as described in reference to FIG. 4, except that the monomers of formula (III) include the halogen as $R^{2'}$ at the outset. The copolymerization reaction and quenching may be carried out as described in reference to FIG. 4. In this example, however, the product mixture includes an intermediate copolymer 16. This intermediate copolymer 16 includes a recurring unit 18 that is a precursor to the recurring unit 12 of formula (I) and also includes the recurring unit 14 of formula (II).

In this example of the method, $NaN_3$ is added to the intermediate product mixture. This mixture is heated in order to initiate a reaction that will replace the halogen groups with the azido groups. In one example, the $NaN_3$ is present at a 50-fold excess relative to the recurring unit 18 in order to ensure that the halogen groups are replaced.

Figure 6:
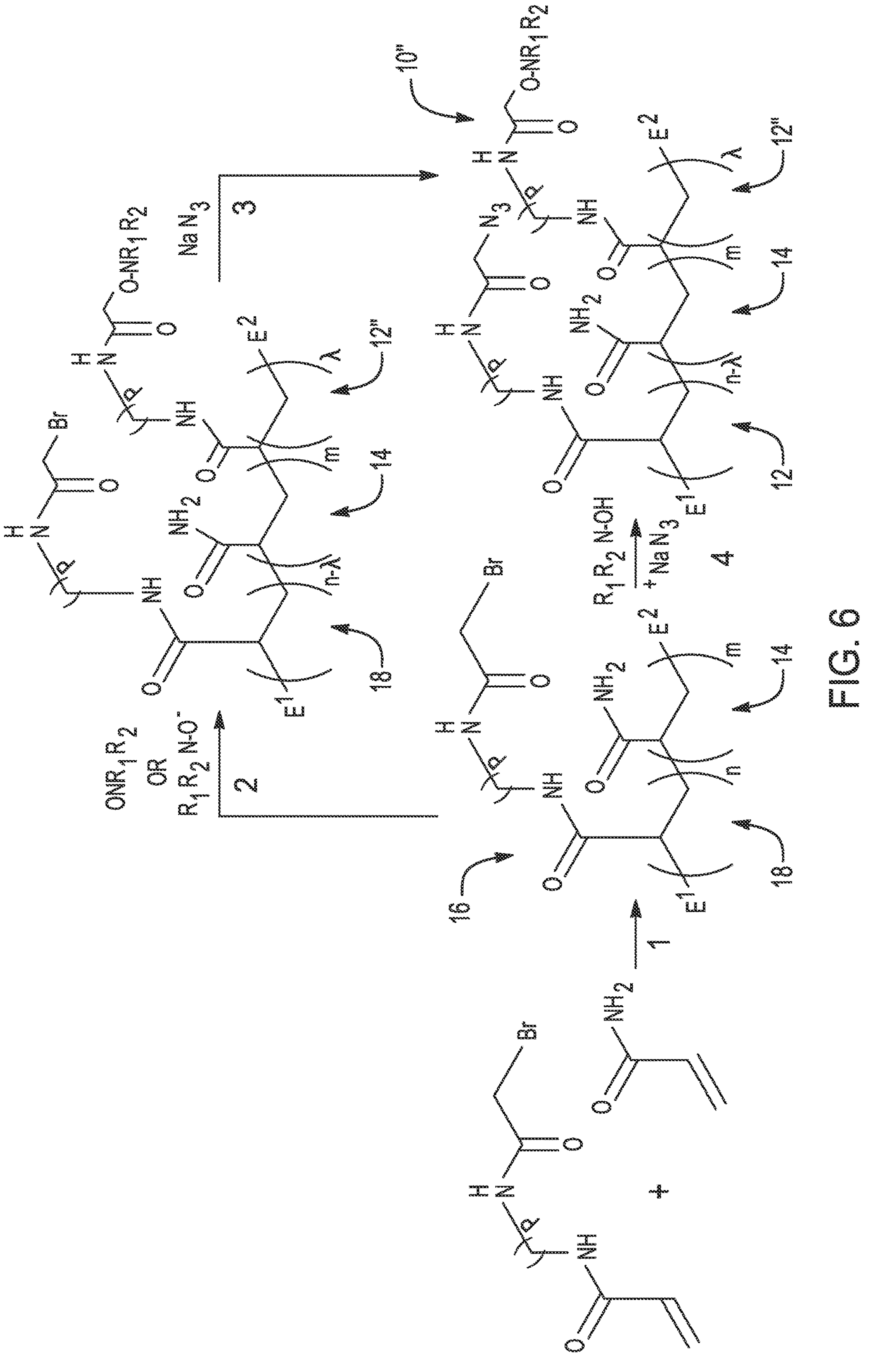
FIG. 6 is a schematic illustration of additional chemical reactions to form another example of the copolymer disclosed herein.

Still other examples of the one-pot synthesis are shown schematically in FIG. 6. In this example, the monomer of formula (V) is utilized with the monomer of formula (IV). In this example, the "halo" of formula (V) is Br, and the monomer of formula (IV) includes —H as each of $R^{3'}$, $R^4$, and $R^{4'}$ and $C(O)NH_2$ as $R^3$.

In this example, the reaction mixture includes the monomers of formula (V), the monomers of formula (IV), and the NMP unimolecular initiator or the combination of the water soluble initiator and the nitroxide. The monomers of formula (V) and formula (IV) may be present in a suitable weight ratio with respect to one another such that the desirable number of respective recurring units 12+12', 14 is introduced into the resulting copolymer 10". The NMP unimolecular initiator or the combination of the water soluble initiator and the nitroxide may be present in an amount that enables all of the monomers in the reaction mixture to copolymerize. The reaction mixture may also include water, a solvent, or a combination of water with the solvent.

The copolymerization reaction and quenching may be carried out as described in reference to FIG. 4. In this example, however, the product mixture includes the intermediate copolymer 16. This intermediate copolymer 16 includes a recurring unit 18 that is a precursor to each of the recurring units 12 and 12" and also includes the recurring unit 14 of formula (II). Copolymerization is shown at step 1 in FIG. 6.

Each example of the method shown in FIG. 6 involves converting some of the halogens (the halo groups, shown as Br in FIG. 6) to alkoxyamines and some other of the halogens (halo groups) to azides after the copolymerization.

In one example method, the conversion involves first converting some of the halogens to alkoxyamines (step 2 in FIG. 6) and then converting some other of the halogens to azides (step 3 in FIG. 6). Step 2 may involve introducing a hydroxylamine to the copolymer so that the halogens are in excess of the hydroxylamine, and heating the copolymer to initiate a reaction where the hydroxylamine displaces some of the halogens. Step 3 may involve introducing $NaN_3$ to the copolymer (which now includes the alkoxyamine in some of the side chains), and heating the copolymer to initiate a reaction where the azide displaces some other of the halogens. The resulting copolymer 10" includes recurring units 12, 12", and 14.

In another example method, the conversion involves first converting some of the halogens to alkoxyamines (step 2 in FIG. 6) and then converting some other of the halogens to azides (step 3 in FIG. 6). In this example, the hydroxylamine may first be deprotonated to form an alkoxyamine anion ($^{31}ONR_1R_2$). As an example, deprotonation may be performed using a strong base, e.g., sodium hydroxide or potassium tert-butoxide, in a polar aprotic solvent. As another example, the deprotonation reaction may be catalyzed by a base, such as 1,8-Diazabicycloundec-7-ene (DBU) or N,N-Diisopropylethylamine (DIPEA) in a polar aprotic solvent. In this example, step 2 may involve introducing the alkoxylamine anion to the copolymer so that the halogens are in excess of the alkoxylamine anion, and heating the copolymer to initiate a reaction where the alkoxylamine anion displaces some of the halogens. Step 3 may involve introducing $NaN_3$ to the copolymer (which now includes the alkoxyamine in some of the side chains), and heating the copolymer to initiate a reaction where the azide displaces some other of the halogens. The resulting copolymer 10" includes recurring units 12, 12", and 14.

In another example method, the conversion involves simultaneously converting some of the halogens to alkoxyamines and some other of the halogens to azides (step 4 in FIG. 6). Step 4 may involve introducing a mixture of hydroxylamine and $NaN_3$ to the copolymer so that the mixture is in excess of the halogens. Because $N_3$ is a stronger nucleophile and is used to drive the reaction to completion, the mixture may result in more of the $N_3$ than the hydroxylamine reacting. The copolymer in the presence of the mixture is heated to initiate reactions where the hydroxylamine displaces some of the halogens and the azide displaces some other of the halogens. If these reactions take place at different temperatures, the temperature may be increased stepwise to initiate both displacement reactions. For example, a higher temperature may be desirable for the hydroxylamine reaction. The resulting copolymer 10" includes recurring units 12, 12", and 14.

Still another example of the method may be performed in order to generate a block copolymer (e.g., including at least one block of recurring units 12 and 14, and at least one block of recurring units 14).

One example of this method involves i) copolymerizing a reaction mixture of a monomer of formula (III) (including the azido as $R^{2'}$) and another monomer (e.g., any example represented by formula (IV) in the presence of the NMP unimolecular initiator or the combination of the water soluble initiator and a nitroxide at a temperature ranging from about 18° C. to about 150° C.; ii) allowing the temperature to drop, and optionally removing (e.g., evaporating off, precipitation of the co-polymer and washing) any unreacted monomers; iii) introducing the monomer of formula (IV); iv) raising the temperature to polymerize the newly added monomers. The process may be repeated to form additional blocks. This process may also be performed by polymerizing the monomer of formula (IV) first and then polymerization the monomer of formula (III) with another monomer.

Another example of this method involves i) copolymerizing a reaction mixture of a monomer of formula (III) (including the halogen as $R^{2'}$) and another monomer (e.g., any example represented by formula (IV) in the presence of the NMP unimolecular initiator or the combination of the water soluble initiator and a nitroxide at a temperature ranging from about 18° C. to about 150° C.; ii) allowing the temperature to drop, and optionally removing any unreacted monomers; iii) introducing the monomer of formula (IV); iv) raising the temperature to polymerize the newly added monomers. The process may be repeated to form additional blocks. In this example, the resulting block copolymer is similar to the intermediate copolymer 16, and includes block(s) of the recurring unit 18. In this example of the method, $NaN_3$, or a mixture of hydroxylamine and $NaN_3$, or hydroxylamine followed by $NaN_3$, or an alkoxylamine anion followed by $NaN_3$, is added to the product mixture. This mixture is heated in order to initiate reaction(s) that will replace the halogen groups with the azido groups or azido groups and alkoxyamine groups. In one example, the $NaN_3$ is present at a 50-fold excess relative to the recurring unit 18 in order to ensure that the halogen groups are replaced.

FIG. 4, FIG. 5, and FIG. 6 each depict the individual units of the copolymer 10, 10" in block. It is to be understood, however, that the incorporation of the individual units may be statistical, random, or in block, and may depend upon the method used to synthesize the copolymer 10, 10', 10".

Methods for Incorporating the Copolymer on a Flow Cell Surface

The examples of the copolymer 10, 10', 10" disclosed herein may be attached to at least a portion of a flow cell surface. Method(s) for attaching the copolymer 10, 10', 10" to the flow cell surface are generally described in reference to FIG. 7. While some details about the flow cell surface are described in reference to FIG. 7, it is to be understood that examples of the individual flow cell architectures will be described in more detail in reference to FIG. 8A through FIG. 8D.

Figure 7:
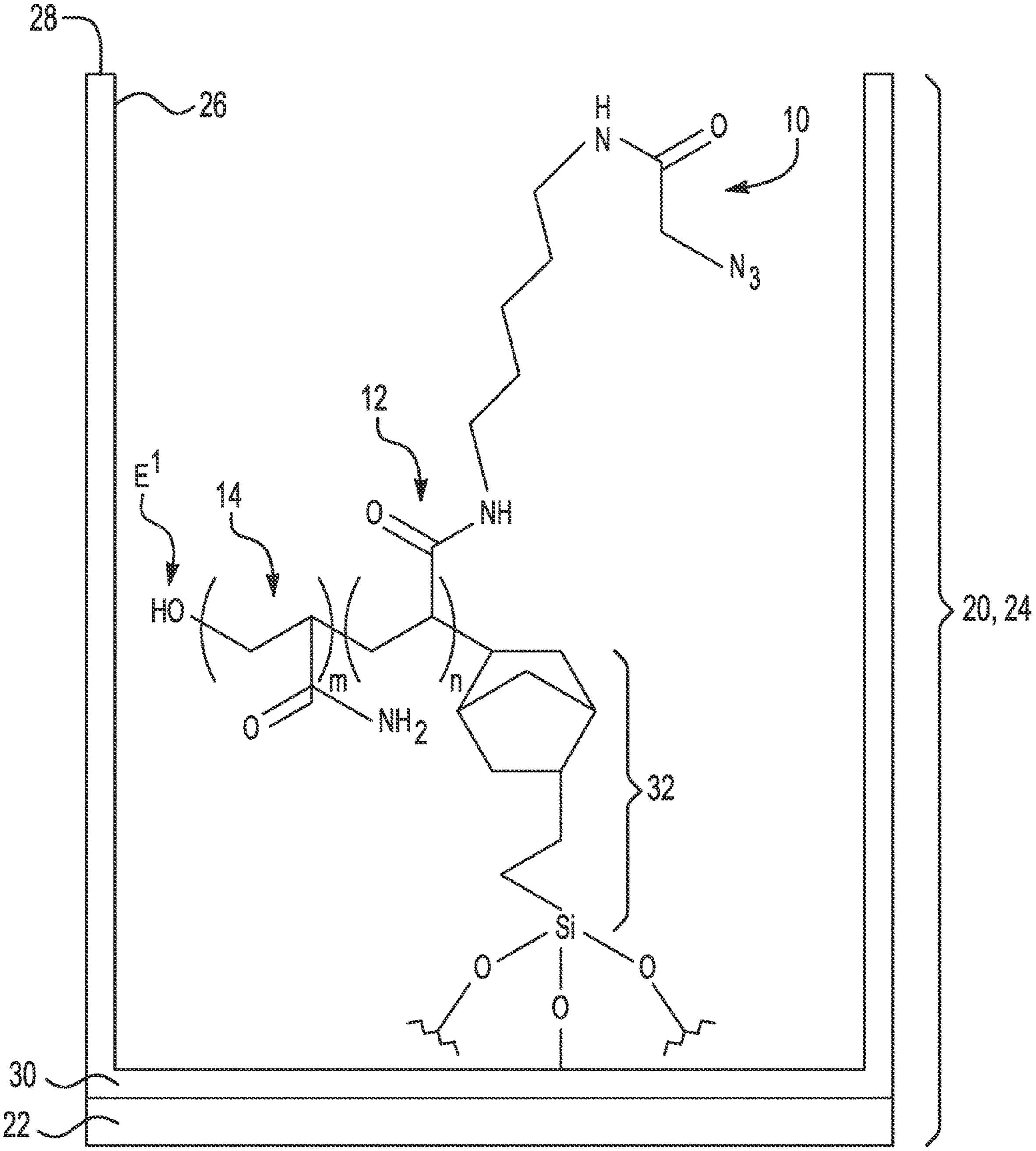
FIG. 7 is a schematic illustration of a depression of a flow cell surface having a silanized surface and an example of the copolymer coating attached to the silanized surface.

As shown in FIG. 7, the flow cell surface includes a substrate 20. The substrate 20 may include a single layer base support 22 (FIG. 8B, and FIG. 8C) or may include a multi-layered structure 24 (FIG. 7 and FIG. 8D). The substrate 20 may be non-patterned (e.g., includes a single lane 23 surrounded by interstitial regions 28 as shown in FIG. 8B and FIG. 8C) or patterned (e.g., includes depressions 26 separated by interstitial regions 28 as shown in FIG. 7 and FIG. 8D).

Examples of suitable materials for the single layer base support 22 include epoxy siloxane, glass, modified or functionalized glass, plastics (including acrylics, polystyrene and copolymers of styrene and other materials, polypropylene, polyethylene, polybutylene, polyurethanes, polytetrafluoroethylene (such as TEFLON® from Chemours), cyclic olefins/cyclo-olefin polymers (COP) (such as ZEONOR® from Zeon), polyimides, etc.), nylon (polyamides), ceramics/ceramic oxides, silica, fused silica, or silica-based materials, aluminum silicate, silicon and modified silicon (e.g., boron doped p+ silicon), silicon nitride ($Si_3N_4$), silicon oxide ($SiO_2$), tantalum pentoxide ($Ta_2O_5$) or other tantalum oxide (s) ($TaO_x$), hafnium oxide ($HfO_2$), carbon, metals, inorganic glasses, or the like.

In some examples, the single lane 23 can be the top surface of the base support 22 and the walls of the lane 23 can be defined by a bonding material positioned on the base support. In other examples, the single lane 23 can be etched into the top surface of the base support 22.

Examples of the multi-layered structure 24 include the base support 22 and at least one other layer 30 thereon. Some examples of the multi-layered structure 24 include glass or silicon as the base support 22, with a coating layer (e.g., layer 30) of tantalum oxide (e.g., tantalum pentoxide or another tantalum oxide(s) ($TaO_x$)) or another ceramic oxide at the surface. Other examples of the multi-layered structure 24 include the base support 22 (e.g., glass, silicon, tantalum pentoxide, etc.) and a patterned resin as the other layer 30. It is to be understood that any material that can be selectively deposited, or deposited and patterned to form the depressions 26 and interstitial regions 28 may be used for the patterned resin.

An inorganic oxide is one example of the patterned resin. The inorganic oxide may be selectively applied to the base support 22 via vapor deposition, aerosol printing, or inkjet printing. Examples of suitable inorganic oxides include tantalum oxide (e.g., $Ta_2O_5$), aluminum oxide (e.g., $Al_2O_3$), silicon oxide (e.g., $SiO_2$), hafnium oxide (e.g., $HfO_2$), etc.

As another example of the patterned resin, a polymeric resin may be applied to the base support 22 and then patterned. Suitable deposition techniques include chemical vapor deposition, dip coating, dunk coating, spin coating, spray coating, puddle dispensing, ultrasonic spray coating, doctor blade coating, aerosol printing, screen printing, microcontact printing, etc. Suitable patterning techniques include photolithography, nanoimprint lithography (NIL), stamping techniques, embossing techniques, molding techniques, microetching techniques, etc. Some examples of suitable resins include a polyhedral oligomeric silsesquioxane resin (POSS)-based resin, a non-POSS epoxy resin, a poly(ethylene glycol) resin, a polyether resin (e.g., ring opened epoxies), an acrylic resin, an acrylate resin, a methacrylate resin, an amorphous fluoropolymer resin (e.g., CYTOP® from Bellex), and combinations thereof.

As used herein, the term "polyhedral oligomeric silsesquioxane" refers to a chemical composition that is a hybrid intermediate (e.g., $RSiO_{1.5}$) between that of silica ($SiO_2$) and silicone ($R_2SiO$). An example of polyhedral oligomeric silsesquioxane may be that described in Kehagias et al., Microelectronic Engineering 86 (2009), pp. 776-778, which is incorporated by reference in its entirety. Some polyhedral oligomeric silsesquioxanes are commercially available under the tradename POSS® from Hybrid Plastics. In an example, the composition is an organosilicon compound with the chemical formula $[RSiO_{3/2}]_n$, where the R groups can be the same or different. Example R groups for polyhedral oligomeric silsesquioxane include epoxy, azide/azido, a thiol, a poly(ethylene glycol), a norbornene, a tetrazine, acrylates, and/or methacrylates, or further, for example, alkyl, aryl, alkoxy, and/or haloalkyl groups.

In an example, the single base support 22 (whether used singly or as part of the multi-layered structure 24) may be a circular sheet, a panel, a wafer, a die etc. having a diameter ranging from about 2 mm to about 300 mm, e.g., from about 200 mm to about 300 mm, or may be a rectangular sheet, panel, wafer, die etc. having its largest dimension up to about 10 feet (~3 meters). For example, a die may have a width ranging from about 0.1 mm to about 10 mm. While example dimensions have been provided, it is to be understood that a single base support 22 with any suitable dimensions may be used.

In the examples disclosed herein, the substrate 20 may be activated prior to attaching the copolymer 10, 10', 10" thereto. If the material selected for the single base support 22 or the layer 30 of the multi-layer structure 24 have surface —OH groups, the activation of the substrate 20 involves silanization. If the material selected for the single base support 22 or the layer 30 of the multi-layer structure 24 has minimal or no surface —OH groups, the activation of the substrate 20 involves plasma ashing (to introduce or increase surface —OH groups) followed by silanization.

In the examples disclosed herein, a silane derivative, specifically a norbornene silane 32, is deposited on the surfaces of the substrate 20 using vapor deposition, spin coating, or other deposition methods. In an example, the norbornene silane is [(5-bicyclo[2.2.1]hept-2-enyl)ethyl] trimethoxysilane. Other alkyne or alkene terminated silanes may also be used.

It is to be understood that any exposed surface of the substrate 20 (e.g., any exposed surface of the single base support 22 or any exposed surface of the layer 30) will be silanized. In the example shown in FIG. 7 and FIG. 8D, each of the depressions 26 and the interstitial regions 28 will be silanized. In the example shown in FIG. 8C, the entire single lane 23 and the interstitial regions 28 will be silanized. In this example, substrate 20 includes the base support 22 and a plurality of norbornene silane molecules 32 attached to the base support 22. In the example shown in 8B, a mask may be used during silanization. In these examples, only portions of the single lane 23 where it is desirable to attach the copolymer 10, 10', 10" (see FIG. 8B) will be silanized.

In FIG. 7, the norbornene silane 32 is shown covalently attached to the surface —OH groups in the depression 26, but is not shown on the interstitial regions 28. It is to be understood that the initial silanization process will deposit the norbornene silane 32 on any exposed surface of the substrate 20 (including any exposed interstitial regions 28). As will be described in more detail below, subsequent processing can be used to at least substantially clear the interstitial regions 28 of materials (e.g., of copolymer 10, 10', 10", norbornene silane 32).

In some examples of the method, the copolymer 10, 10', 10" is prepared in accordance with any of the example methods set forth herein, and then is attached to the norbornene silane molecules 32 at the surface of the substrate 20.

For example, copolymerization of the monomers of formulas (III) and (IV) may be performed followed by quenching (e.g., FIG. 4 or FIG. 5). For another example, copolymerization of the monomers of formulas (V) and (IV) may be performed followed by displacement of the halogens (e.g., FIG. 6). For another example, the method may be performed to generate a block version of the copolymer 10, 10', 10". Any of these methods generates a product mixture. The product mixture includes the copolymer chains 10, 10', 10" and at least some of the copolymer chains 10, 10', 10" include the alkoxyamine end group $E^2$ and/or the alkoxyamine in some of the side chains.

For attachment to the substrate 20, the method then includes depositing the product mixture on the substrate 20 having the surface bound norbornene silane molecules 32; and reacting at least some of the alkoxyamine end groups $E^2$ and/or the alkoxyamines in the side chains with at least some of the surface bound norbornene silane molecules 32. The product mixture may be deposited using any of the deposition techniques disclosed herein. The copolymer chains 10, 10', 10" in the deposited product mixture may be allowed to react with the surface bound norbornene silane molecules 32 for a desirable time period and at a desirable temperature. The temperature may range from about 35° C. to about 150° C., and the time may range from about 10 minutes to about 24 hours. In one example, the reaction time is about 30 minutes and the reaction temperature is about 50° C.

The reaction conditions may activate the alkoxyamine end groups $E^2$ and/or the alkoxyamines in the side chains of at least some of the copolymer chains 10, 10', 10" causing these groups to separate to form the free radicals. In this example, at least one of the plurality of norbornene silane molecules 32 attaches to a respective copolymer chain 10, 10', 10" at the end or side chain where the nitroxide free radical separated. As such, "attachment through the alkoxyamine" means that the separation of the free radical generates an open end or side chain that is capable of reacting with the norbornene silane molecules, and that the free nitroxide may or may not reattach to the norbornene silane molecule. More specifically, as shown in FIG. 7, the norbornene portion of the surface bound norbornene silane molecules 32 covalently attaches to the remaining copolymer chain 10, 10', 10" where the nitroxide free radical has separated from copolymer chain 10, 10', 10". While one attachment mechanism is shown, it is believed that the nitroxide free radical may release from side chain(s) to enable attachment to the surface bound norbornene silane molecules 32 via other mechanisms as well. Since the alkoxyamine surface binding does not involve the azido groups of the copolymer 10, 10', 10" these groups remain free for additional surface binding or for primer binding. Some of the alkoxyamine groups may remain attached to the copolymer 10, 10', 10" and may not be involved in surface attachment.

In other examples of the method, the copolymer 10, 10', 10" is prepared in accordance with any of the example methods set forth herein in the presence of the substrate 20 having the surface bound norbornene silane molecules 32.

In one example, the monomers of formulas (III) and (IV) may be copolymerized in the presence of the NMP unimolecular initiator or the combination of the water soluble initiator and the nitroxide and the substrate 20 having the surface bound norbornene silane molecules 32. This example may be performed with or without TeMED, and may be performed as described in FIG. 4. Because copolymerization takes place in the presence of substrate 20, at least some of the generated copolymer chains 10, 10', 10" i) include alkoxyamine end groups $E^2$ and/or ii) are attached to the norbornene silane molecules 32 through the alkoxyamine end groups $E^2$.

In another example, the monomers of formulas (III) and (IV) may be sequentially polymerized in the presence of the NMP initiator and the substrate 20 having the surface bound norbornene silane molecules 32. This example involves the processes described herein for generating the block copolymer. Because sequential polymerization takes place in the presence of substrate 20, at least some of the generated block copolymer chains 10, 10', 10" i) include alkoxyamine end groups $E^2$ and/or ii) are attached to the norbornene silane molecules 32 through the alkoxyamine end groups $E^2$.

In still another example, the method shown in FIG. 5 is performed in the presence of the substrate 20. This example will result in the covalent attachment of the intermediate copolymer 16 to the norbornene silane molecules 32 through the alkoxyamine end groups $E^2$. In this example method, $NaN_3$ is added to the intermediate copolymer coating, which is heated in order to initiate a reaction that will replace the halogen groups with the azido groups. This additional reaction converts the intermediate copolymer coating to the copolymer coating (which includes the copolymer chains 10, 10' covalently attached to the substrate 20).

The example methods shown in FIG. 6 may also be performed and then the copolymer 10" may be deposited on the substrate 20, or they may be performed in the presence of the substrate 20.

Whether the reaction of the copolymer chains 10, 10', 10" with the surface bound norbornene silane molecules 32 takes place after copolymer chain 10, 10', 10" formation or during copolymer chain 10, 10', 10" formation, this reaction generates a copolymer coating on any exposed surface the substrate 20. As described herein, this copolymer coating is covalently attached to the substrate 20 through the alkoxyamine. In some examples, the copolymer coating is used as is, and primers may be connected thereto (described below). In other examples, the copolymer coating is subjected to an additional curing process in order to increase the strength of the surface attachment. In these other examples, the method further includes curing the product mixture or copolymer coating on the substrate 20, whereby some of the azido groups react with some other of the surface bound norbornene silane molecules 32. Any unreacted norbornene silane molecules 32 may react with azido groups of the copolymer chains 10, 10', 10" during a curing process. In an example, curing may take place at a temperature ranging from room temperature (e.g., about 25° C.) to about 95° C. for a time ranging from about 1 millisecond to about several days.

Any of the surface attachment methods disclosed herein results in the formation of a copolymer coating on any exposed surface the substrate 20 that contains the norbornene silane molecules 32.

As such, in some examples, the interstitial regions 28 adjacent to a single lane 23 (FIG. 8C) or the interstitial regions 28 adjacent to depressions 26 (FIG. 7 and FIG. 8D) may be coated with the copolymer coating. It may be desirable for the interstitial regions 28 to be clear of the copolymer coating so that these surfaces can be used for bonding and/or or so that primers attach within the single lane 23 or within the depressions 26 but not on the interstitial regions. In these examples, any of the copolymer coating that overlies the interstitial regions 28 may be removed, e.g., using a polishing process. The polishing process may be performed with a chemical slurry (including, e.g., an abrasive, a buffer, a chelating agent, a surfactant, and/or a dispersant) which can remove the copolymer coating from the interstitial regions 28 without deleteriously affecting the underlying substrate 20 (e.g., base support 22 or layer 30) at those regions 28. Alternatively, polishing may be performed with a solution that does not include the abrasive particles. The chemical slurry may be used in a chemical mechanical polishing system to polish the surface of the interstitial regions 28. The polishing head(s)/pad(s) or other polishing tool(s) is/are capable of polishing any copolymer coating that may be present over the interstitial regions 28 while leaving the copolymer coating in the single lane 23 or in the depression(s) 26 at least substantially intact. As an example, the polishing head may be a Strasbaugh ViPRR II polishing head.

In the example shown in FIG. 8C, the copolymer coating 10B remains in the single lane 23 after polishing. In the example shown in FIG. 8D, the copolymer coating 10C remains in each of the depressions 26 after polishing.

In other examples, the copolymer coating selectively attaches to the substrate 20, and thus removal processes, such as polishing, are not utilized. For example, when masking techniques are used to deposit the norbornene silane molecules in predetermined areas of the substrate 20 (as described above in reference to FIG. 8B), the copolymer coating will attach to those predetermined areas but will not attach to any other area of the substrate 20 that is not subjected to silanization. An example is shown in FIG. 8A, where the copolymer coating 10A forms isolated pads on the surface of the single lane 23.

Flow Cells

Figure 8A:
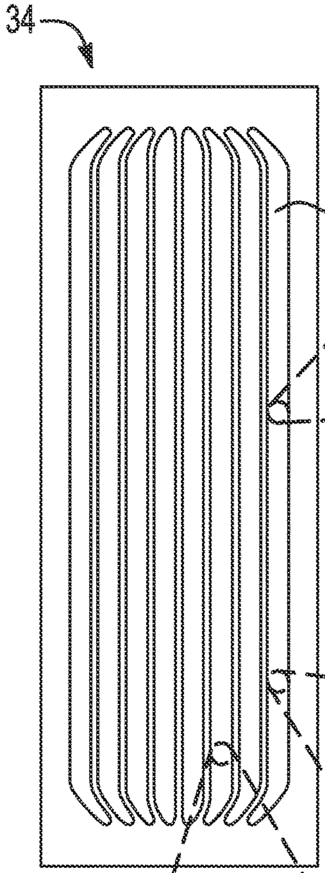
FIG. 8A is a top view of a flow cell.
Figure 8B:
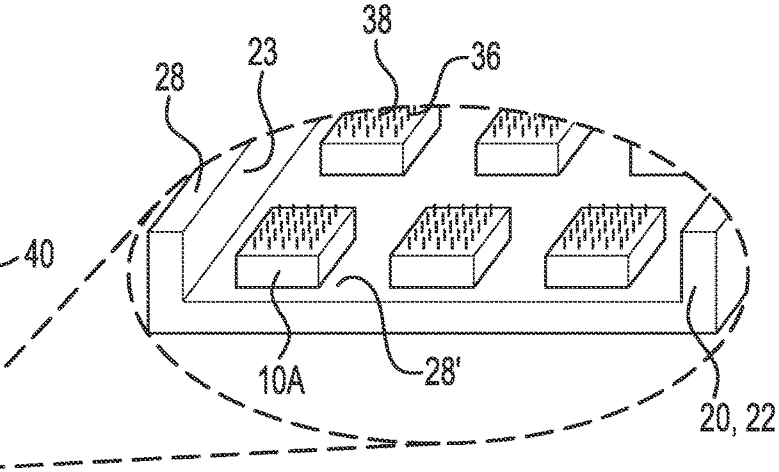
FIG. 8B through FIG. 8D are enlarged, and partially cutaway views of different example architectures within a flow channel of the flow cell.
Figure 8C:
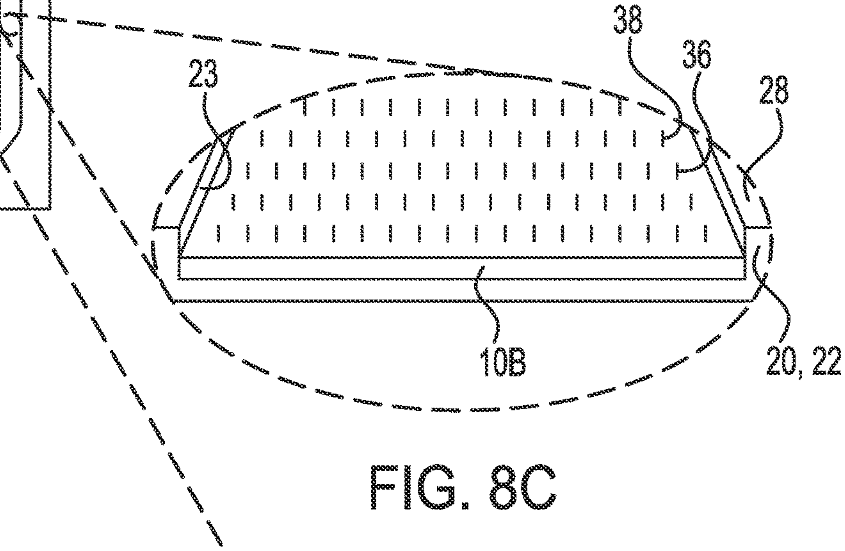
Figure 8D:
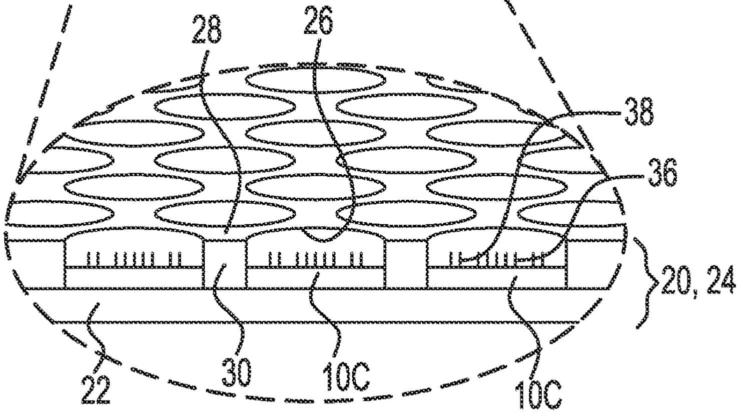

A top view of an example flow cell 34 is shown in FIG. 8A. Examples of the different copolymer coatings 10A, 10B, 10C that can be formed using the methods disclosed herein are depicted in FIGS. 8B, FIG. 8C, and FIG. 8D, respectively.

The flow cell 34 may include two of the substrates 20 bonded together or one substrate 20 bonded to a lid. The substrate(s) 20 include one or more reactive surfaces, which include an example of the copolymer coating 10A, 10B, 10C and primers 36, 38.

Defined between the bonded substrates 20 or the one substrate 20 and the lid is a flow channel 40. As such, the flow channel 40 is in fluid communication with the reactive surface(s) of the substrate(s) 20.

The example shown in FIG. 8A includes eight flow channels 40. While eight flow channels 40 are shown, it is to be understood that any number of flow channels 40 may be included in the flow cell 34 (e.g., a single flow channel 40, four flow channels 40, etc.). Each flow channel 40 may be isolated from each other flow channel 40 so that fluid introduced into any flow channel 40 does not flow into any adjacent flow channel 40. Some examples of the fluids introduced into the flow channel 40 may include reaction components (e.g., DNA sample, polymerases, sequencing primers, nucleotides, etc.), washing solutions, deblocking agents, etc.

In an example, the flow channel 40 has a rectilinear configuration.

A bonding material, not shown, may be used to attach the substrates 20 or the substrate 20 and the lid together. Any suitable bonding material, such as an adhesive, a radiation-absorbing material that aids in bonding, etc., may be used. The depth of the flow cell 40 may depend, in part, upon the thickness of the bonding material. The depth of the flow channel 40 can be as small as a monolayer thick when microcontact, aerosol, or inkjet printing is used to deposit the bonding material. In other examples, the depth of the flow channel 40 can be about 1 μm, about 10 μm, about 50 μm, about 100 μm, or more. In an example, the depth may range from about 10 μm to about 100 μm. In another example, the depth may range from about 10 μm to about 30 μm. In still another example, the depth is about 5 μm or less. It is to be understood that the depth of the flow channel 40 may be greater than, less than or between the values specified above.

FIG. 8B, FIG. 8C, and FIG. 8D depict examples of the architecture of the substrate 20 and within the flow channel 40. As shown in FIG. 8B, the architecture may include the copolymer coating 10A in the form of isolated pads (separated by interstitial regions 28') on a surface of the single layer base support 22/substrate 20. As shown in FIG. 8C, the architecture may include the copolymer coating 10B in the form of a coating layer on the entire surface of the single lane 23 that is defined in the single layer base support 22/substrate 20. As shown in FIG. 8D, the architecture may include the copolymer coating 10C in the form of individual layers positioned within each of the depressions 26 and not on the interstitial regions 28.

Many different layouts of the isolated pad copolymer coating 10A and the depressions 26 may be envisaged, including regular, repeating, and non-regular patterns. In an example, the isolated pad copolymer coatings 10A or the depressions 26 are disposed in a hexagonal grid for close packing and improved density. Other layouts may include, for example, rectilinear (rectangular) layouts, triangular layouts, and so forth. In some examples, the layout or pattern can be an x-y format in rows and columns. In some other examples, the layout or pattern can be a repeating arrangement of the isolated pad copolymer coatings 10A or the depressions 26. In still other examples, the layout or pattern can be a random arrangement.

The layout or pattern may be characterized with respect to the density (number) of the isolated pad copolymer coatings 10A or the depressions 26 in a defined area. For example, the isolated pad copolymer coatings 10A or the depressions 26 may be present at a density of approximately 2 million per $mm^2$. The density may be tuned to different densities including, for example, a density of about 100 per $mm^2$, about 1,000 per $mm^2$, about 0.1 million per $mm^2$, about 1 million per $mm^2$, about 2 million per $mm^2$, about 5 million per $mm^2$, about 10 million per $mm^2$, about 50 million per $mm^2$, or more, or less. It is to be further understood that the density can be between one of the lower values and one of the upper values selected from the ranges above, or other densities (outside of the given ranges) may be used.

The layout or pattern of the isolated pad copolymer coatings 10A or the depressions 26 may also or alternatively be characterized in terms of the average pitch, or the spacing from the center of one isolated pad copolymer coating 10A or one depression 26 to the center of an adjacent isolated pad copolymer coating 10A or depression 26 (center-to-center spacing) or from the right edge of one isolated pad copolymer coating 10A or one depression 26 to the left edge of an adjacent isolated pad copolymer coating 10A or one depression 26 (edge-to-edge spacing). The pattern can be regular, such that the coefficient of variation around the average pitch is small, or the pattern can be non-regular in which case the coefficient of variation can be relatively large. In either case, the average pitch can be, for example, about 50 nm, about 0.1 μm, about 0.5 μm, about 1 μm, about 5 μm, about 10 μm, about 100 μm, or more or less. The average pitch for a particular pattern of can be between one of the lower values and one of the upper values selected from the ranges above. In an example, the depressions 20 have a pitch (center-to-center spacing) of about 1.5 μm. While example average pitch values have been provided, it is to be understood that other average pitch values may be used.

The size of each depression 26 may be characterized by its volume, opening area, depth, and/or diameter or length and width. For example, the volume can range from about $1\times10^{-3}$ $\mu m^3$ to about 100 $\mu m^3$, e.g., about $1\times10^{-2}$ $\mu m^3$, about 0.1 $\mu m^3$, about 1 $\mu m^3$, about 10 $\mu m^3$, or more, or less. For another example, the opening area can range from about $1\times10^{-3}$ $\mu m^2$ to about 100 $\mu m^2$, e.g., about $1\times10^{-2}$ $\mu m^2$, about 0.1 $\mu m^2$, about 1 $\mu m^2$, at least about 10 $\mu m^2$, or more, or less. For still another example, the depth can range from about 0.1 μm to about 100 μm, e.g., about 0.5 μm, about 1 μm, about 10 μm, or more, or less. For yet another example, the depth can range from about 0.1 μm to about 100 μm, e.g., about 0.5 μm, about 1 μm, about 10 μm, or more, or less. For another example, the diameter or length and width can range from about 0.1 μm to about 100 μm, e.g., about 0.5 μm, about 1 μm, about 10 μm, or more, or less.

The size of each isolated pad copolymer coating 10A may be characterized by its top surface area, height, and/or diameter or length and width. For example, the top surface area can range from about $1\times10^{-3}$ $\mu m^2$ to about 100 $\mu m^2$, e.g., about $1\times10^{-2}$ $\mu m^2$, about 0.1 $\mu m^2$, about 1 $\mu m^2$, at least about 10 $\mu m^2$, or more, or less. For still another example, the height can range from about 0.1 μm to about 100 μm, e.g., about 0.5 μm, about 1 μm, about 10 μm, or more, or less. For yet another example, the diameter or length and width can range from about 0.1 μm to about 100 μm, e.g., about 0.5 μm, about 1 μm, about 10 μm, or more, or less.

The copolymer coatings 10A, 10B, 10C, may include any of the example copolymer chains 10, 10', 10'' disclosed herein, and may be formed and attached to the substrate 20 using any of the methods disclosed herein.

The flow cell 34 also includes primers 36, 38.

A grafting process may be performed to graft the primers 36, 38 to the copolymer coatings 10A, 10B, 10C. In an example, the primers 36, 38 can be immobilized to the copolymer coatings 10A, 10B, 10C by single point covalent attachment at or near the 5' end of the primers 36, 38. This attachment leaves i) an adapter-specific portion of the primers 36, 38 free to anneal to its cognate sequencing-ready nucleic acid fragment and ii) the 3' hydroxyl group free for primer extension. In the examples disclosed herein, the covalent attachment may take place at any unreacted azide/azido groups of the copolymer chains 10, 10' in the copolymer coating 10A, 10B, 10C. Examples of terminated primers that may be used include alkyne terminated primers, which can attach to the azide moiety of the copolymer coating 10A, 10B, 10C. Specific examples of suitable primers 36, 38 include P5 and P7 primers used on the surface of commercial flow cells sold by Illumina Inc. for sequencing on HISEQ™, HISEQX™, MISEQ™, MISEQDX™, MINISEQ™, NEXTSEQ™, NEXTSEQ™ DX™, NOVASEQ™, GENOME ANALYZER™, ISEQ™, and other instrument platforms.

In an example, grafting may involve flow through deposition (e.g., using a temporarily bound or permanently bonded lid or permanently bonded second substrate 20), dunk coating, spray coating, puddle dispensing, or by another suitable method that will attach the primers 36, 38 to the copolymer coating 10A, 10B, 10C in the flow channel (s) 40. Each of these example techniques may utilize a primer solution or mixture, which may include the primer(s) 36, 38, water, a buffer, and a catalyst. With any of the grafting methods, the primer(s) 36, 38 react with reactive groups of the copolymer coating 10A, 10B, 10C in the flow channel 40 and have no affinity for the surrounding substrate 20 (e.g., interstitial regions 28, 28'). As such, the primer(s) 36, 38 selectively graft to the copolymer coating 10A, 10B, 10C in the flow channel 40.

Sequencing Method

Examples of the flow cell 34 may be used in an ensemble sequencing technique, such as sequencing by synthesis (SBS). In ensemble sequencing, a template polynucleotide chain (not shown) that is to be sequenced may be formed on the reactive surfaces of the flow cell 34 using the primers 36, 38. At the outset of template polynucleotide chain formation, library templates may be prepared from any nucleic acid sample (e.g., a DNA sample or an RNA sample). The nucleic acid sample may be fragmented into single-stranded, similarly sized (e.g., <1000 bp) DNA fragment or RNA fragments that are subsequently converted into complementary DNA (cDNA) fragments. During preparation, adapters may be added to the ends of these fragments. Through reduced cycle amplification, different motifs may be introduced in the adapters, such as sequencing binding sites, indices, and regions that are complementary to the primers 36, 38. The final library templates include the DNA or cDNA fragment and adapters at both ends. In some examples, the fragments from a single nucleic acid sample have the same adapters added thereto.

A plurality of library templates may be introduced to the flow cell 34. Multiple library templates are hybridized, for example, to one of two types of primers 36, 38 immobilized on the copolymer coating 10A, 10B, 10C.

Cluster generation may then be performed. In one example of cluster generation, the library templates are copied from the hybridized primers by 3' extension using a high-fidelity DNA polymerase. The original library templates are denatured, leaving the copies immobilized on the copolymer coatings 10A, 10B, 10C. Isothermal bridge amplification or some other form of amplification may be used to amplify the immobilized copies. For example, the copied templates loop over to hybridize to an adjacent, complementary primer 38 or 36, and a polymerase copies the copied templates to form double stranded bridges, which are denatured to form two single stranded strands. These two strands loop over and hybridize to adjacent, complementary primers 36 or 38 and are extended again to form two new double stranded loops. The process is repeated on each template copy by cycles of isothermal denaturation and amplification to create dense clonal clusters. Each cluster of double stranded bridges is denatured. In an example, the reverse strand is removed by specific base cleavage, leaving forward template polynucleotide strands. Clustering results in the formation of several template polynucleotide chains across the copolymer coatings 10A, 10B, 10C. This example of clustering is bridge amplification, and is one example of the amplification that may be performed. It is to be understood that other amplification techniques may be used, such as the exclusion amplification (Examp) workflow (Illumina Inc.).

A sequencing primer may be introduced that hybridizes to a complementary sequence on the template polynucleotide chain. This sequencing primer renders the template polynucleotide chain ready for sequencing.

To initiate sequencing, an incorporation mix may be added to the flow cell 34. In one example, the incorporation mix includes a liquid carrier, a polymerase, and fluorescently labeled nucleotides. The fluorescently labeled nucleotides may include a 3' OH blocking group. When the incorporation mix is introduced into the flow cell 34, the fluid enters the flow channel 40 and contacts the reactive surfaces.

The fluorescently labeled nucleotides are added to the sequencing primer (thereby extending the sequencing primer) in a template dependent fashion such that detection of the order and type of nucleotides added to the sequencing primer can be used to determine the sequence of the template. More particularly, one of the nucleotides is incorporated, by a respective polymerase, into a nascent strand that extends the sequencing primer and that is complementary to the template polynucleotide chain. In other words, in at least some of the template polynucleotide chains across the flow cell 34, respective polymerases extend the hybridized sequencing primer by one of the nucleotides in the incorporation mix.

The incorporation of the nucleotides can be detected through an imaging event. During an imaging event, an illumination system (not shown) may provide an excitation light to the flow channel 40 and the reactive surfaces of the flow cell 34.

In some examples, the nucleotides can further include a reversible termination property (e.g., the 3' OH blocking group) that terminates further primer extension once a nucleotide has been added to the sequencing primer. For example, a nucleotide analog having a reversible terminator moiety can be added to the sequencing primer such that subsequent extension cannot occur until a deblocking agent is delivered to remove the moiety. Thus, for examples that use reversible termination, a deblocking reagent can be delivered to the flow cell 34 after detection occurs.

Wash(es) may take place between the various fluid delivery steps. The SBS cycle can then be repeated n times to extend the sequencing primer by n nucleotides, thereby detecting a sequence of length n.

While SBS has been described in detail, it is to be understood that the flow cells 34 described herein may be utilized with other sequencing protocol, for genotyping, or in other chemical and/or biological applications. In some instances, the primers of the flow cell may be selected to enable simultaneous paired-end sequencing, where both forward and reverse strands are present on the copolymer coating 10A, 10B, 10C, allowing for simultaneous base calling of each read. Sequential and simultaneously paired-end sequencing facilitates detection of genomic rearrangements and repetitive sequence elements, as well as gene fusions and novel transcripts. In another example, the flow cells 34 disclosed herein may be used for on-cell library generation.

ADDITIONAL NOTES

It should be appreciated that all combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein. It should also be appreciated that terminology explicitly employed herein that also may appear in any disclosure incorporated by reference should be accorded a meaning most consistent with the particular concepts disclosed herein.

Reference throughout the specification to “one example”, “another example”, “an example”, and so forth, means that a particular element (e.g., feature, structure, and/or characteristic) described in connection with the example is included in at least one example described herein, and may or may not be present in other examples. In addition, it is to be understood that the described elements for any example may be combined in any suitable manner in the various examples unless the context clearly dictates otherwise.

It is to be understood that the ranges provided herein include the stated range and any value or sub-range within the stated range, as if such values or sub-ranges were explicitly recited. For example, a range from about 200 mm to about 300 mm, should be interpreted to include not only the explicitly recited limits of from about 200 mm to about 300 mm, but also to include individual values, such as about 240 mm, about 250.5 mm, etc., and sub-ranges, such as from about 225 mm to about 275 mm, etc. Furthermore, when “about” and/or “substantially” are/is utilized to describe a value, they are meant to encompass minor variations (up to +/−10%) from the stated value.

While several examples have been described in detail, it is to be understood that the disclosed examples may be modified. Therefore, the foregoing description is to be considered non-limiting.

What is claimed is:

1. A flow cell, comprising: a substrate; and a copolymer coating attached to at least a portion of the substrate, the copolymer coating including a plurality of copolymer chains, wherein each copolymer chain includes:

a first recurring unit of formula (I):

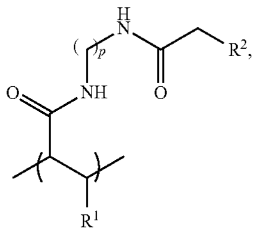

wherein: R' is selected from the group consisting of —H, a halogen, an alkyl, an alkoxy, an alkenyl, an alkynyl, a cycloalkyl, an aryl, a heteroaryl, a heterocycle, and optionally substituted variants thereof; $R^2$ is an azido; each $(CH_2)p$ can be optionally substituted; and p is an integer from 1 to 50; and a second recurring unit of formula II

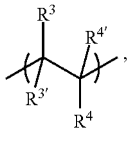

wherein each of $R^3$, $R^3$, $R^4$, $R^4$ is independently selected from the group consisting of —H, $R^5$, —$OR^S$, —C(O)$OR^S$, —C(O)$R^5$, —OC(O)$R^5$, —C(O)$NR^6R$, and —$NR^6R^7$-$R^5$ is selected from the group consisting of —H, —OH, an alkyl, a cycloalkyl, a hydroxyalkyl, an aryl, a heteroaryl, a heterocycle, and optionally substituted variants thereof; and each of $R^6$ and $R^7$ is independently selected from the group consisting of —H and an alkyl; and wherein at least one of the copolymer chains include at least one alkoxyamine end group.

2. The flow cell as defined in claim 1 wherein the substrate includes a base support and a plurality of norbornene silane molecules attached to the base support.

3. The flow cell as defined in claim 2, wherein at least one of the plurality of norbornene silane molecules attaches to a respective copolymer chain through the at least one alkoxyamine end group.

4. The flow cell as defined in claim 1, wherein $R^2$ of at least one of the copolymer chains is replaced with tetramethylethylenediamine.

5. The flow cell as defined in claim 4, wherein the copolymer coating includes at least one of the branched copolymer chains.

6. The flow cell as defined in claim 1, wherein:

each of $R^{3'}$, $R^4$, and $R^{4'}$ is —H;

$R^3$ is —C(O)$NR^6R^7$; and each of $R^6$ and $R^7$ is —H.

7. The flow cell as defined in claim 6, wherein:

$R^1$ is —H; and p is 5.

8. The flow cell as defined in claim 1, wherein:

the substrate includes depressions separated by interstitial regions; and the copolymer coating is attached within the depressions.

9. The flow cell as defined in claim 1, wherein:

the copolymer coating forms isolated pads on a surface of the substrate; and interstitial regions separate the isolated pads.

10. The flow cell as defined in claim 1, wherein:

the first recurring unit and the second recurring unit form a random copolymer; or the first recurring unit and the second recurring unit form a statistical copolymer; or the first recurring unit and the second recurring unit form a block copolymer.

11. A method, comprising: copolymerizing a reaction mixture of monomers of formula (III):

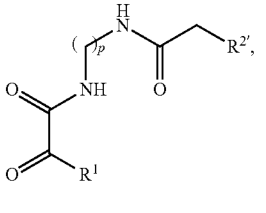

and monomers of formula (IV):

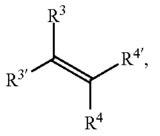

wherein: for formula (III): R' is selected from the group consisting of —H, a halogen, an alkyl, an alkoxy, an alkenyl, an alkynyl, a cycloalkyl, an aryl, a heteroaryl, a heterocycle, and optionally substituted variants thereof; $R^2$ is an azido or a halogen; each $(CH_2)$p can be optionally substituted; and p is an integer from 1 to 50; and for formula (IV): each of $R^3$, $R^3$, $R^4$, $R^4$ is independently selected from the group consisting of —H, $R^5$, —$OR^S$, —C(O)$OR^S$, —C(O)$R^5$, —OC(O)$R^5$, —C(O)$NR^6R^7$, and —$NR^6R^7$-$R^5$ is selected from the group consisting of —H, —OH, an alkyl, a cycloalkyl, a hydroxyalkyl, an aryl, a heteroaryl, a heterocycle, and optionally substituted variants thereof; and each of $R^6$ and $R^7$ is independently selected from the group consisting of —H and an alkyl; adding i) a nitroxide mediated polymerization unimolecular initiator or ii) a combination of a water soluble initiator and a nitroxide to the reaction mixture to initiate the copolymerization, thereby generating a product mixture with copolymer chains, whereby at least one of the copolymer chains have an alkoxyamine end group; depositing the product mixture on a substrate having surface bound norbornene silane molecules; and allowing at least one of the alkoxyamine end groups to react with at least one of the surface bound norbornene silane molecules, thereby forming a copolymer coating.

12. The method as defined in claim 11, wherein: $R^2$ is the azido; and the method further comprises curing the copolymer coating, whereby at least one of the azidos react with at least another one of the surface bound norbornene silane molecules.

13. The method as defined in claim 11, wherein:

$R^{2'}$ is the azido; and prior to the copolymerizing, the method further comprises generating the monomer of formula (III) by reacting a monomer of a formula (V):

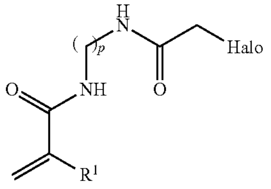

with $NaN_3$ to introduce the azido.

14. The method as defined in claim 11, wherein:

$R^{2'}$ is the halogen; and prior to the deposition of the product mixture, the method further comprises:

introducing $NaN_3$ to the product mixture; and heating the product mixture to replace the halogen with the azido.

15. The method as defined in claim 11, further comprising adding tetramethylethylenediamine to the reaction mixture, and wherein at least one of the copolymer chains are branched.

16. A method, comprising:

adding i) a nitroxide mediated polymerization unimolecular initiator or ii) a combination of a water soluble initiator and a nitroxide to a mixture of a monomer of formula (III):

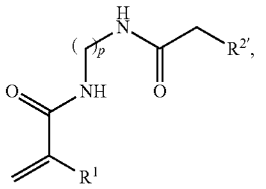

and monomer of formula (IV):

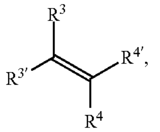

in the presence of a substrate having surface bound norbornene silane molecules, wherein:

for formula (III):

$R^1$ is selected from the group consisting of —H, a halogen, an alkyl, an alkoxy, an alkenyl, an alkynyl, a cycloalkyl, an aryl, a heteroaryl, a heterocycle, and optionally substituted variants thereof;

$R^{2'}$ is an azido or a halogen;

each $(CH_2)_p$ can be optionally substituted; and p is an integer from 1 to 50; and for formula (IV):

each of $R^3$, $R^{3'}$, $R^4$, $R^{4'}$ is independently selected from the group consisting of —H, $R^5$, —$OR^5$, —$C(O)OR^5$, —$C(O)R^5$, —$OC(O)R^5$, —C(O) $NR^6R^7$, and —$NR^6R^7$;

$R^5$ is selected from the group consisting of —H, —OH, an alkyl, a cycloalkyl, a hydroxyalkyl, an aryl, a heteroaryl, a heterocycle, and optionally substituted variants thereof; and each of $R^6$ and $R^7$ is independently selected from the group consisting of —H and an alkyl;

thereby generating a copolymer coating covalently attached to the norbornene silane molecules.

17. The method as defined in claim 16, wherein: $R^2$ is the azido; and the method further comprises curing the copolymer coating on the substrate, whereby at least one of the azidos react with at least another one of the surface bound norbornene silane molecules.

18. The method as defined in claim 16, wherein:

$R^{2'}$ is the azido; and prior to the copolymerizing, the method further comprises generating the monomer of formula (III) by reacting a monomer of a formula (V):

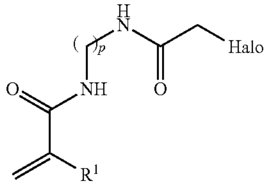

with $NaN_3$ to introduce the azido.

19. The method as defined in claim 16, wherein:

$R^{2'}$ is the halogen; and after the copolymerization, the method further comprises:

introducing $NaN_3$ to the copolymer coating; and heating the copolymer coating to replace the halogen with the azido.

20. The method as defined in claim 19, further comprising curing the copolymer coating on the substrate, whereby at least one of the azidos react with at least another one of the surface bound norbornene silane molecules.

21. The method as defined in claim 16, further comprising adding tetramethylethylenediamine to the mixture during the copolymerization, and wherein at least one of the copolymer chains are branched.

22. A method, comprising: copolymerizing a reaction mixture of a monomer of formula (III): A method, comprising: copolymerizing a reaction mixture of a monomer of formula (III):

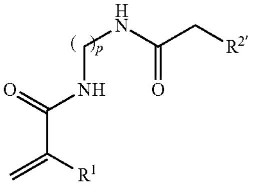

and a different monomer in the presence of i) a -nitroxide mediated polymerization unimolecular initiator or ii) a combination of a water soluble initiator and a nitroxide, wherein: R' is selected from the group consisting of —H, a halogen, an alkyl, an alkoxy, an alkenyl, an alkynyl, a cycloalkyl, an aryl, a heteroaryl, a heterocycle, and optionally substituted variants thereof; $R^2$ is an azido; each $(CH_2)p$ can be optionally substituted; and p is an integer from 1 to 50; quenching the polymerization, thereby generating a first product mixture with block copolymer chains, whereby at least one of the block copolymer chains have an alkoxyamine end group;

adding monomers of formula (IV):

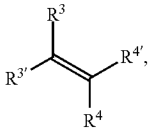

to the first product mixture to generate a second reaction mixture, wherein: each of $R^3$, $R^3$, $R^4$, $R^4$ is independently selected from the group consisting of —H, $R^5$, —OR, —C(O) $OR^5$, —$C(O)R^5$, —OC(O) $R^5$, —$C(O)NR^6R^7$, and —$NR^6R^7$-$R^5$ is selected from the group consisting of —H, —OH, an alkyl, a cycloalkyl, a hydroxyalkyl, an aryl, a heteroaryl, a heterocycle, and optionally substituted variants thereof; and each of $R^6$ and $R^7$ is independently selected from the group consisting of —H and an alkyl; polymerizing the second reaction mixture in the presence of the i) the nitroxide mediated polymerization unimolecular initiator or ii) the combination of the water soluble initiator and the nitroxide; quenching the polymerization, thereby generating a second product mixture with block copolymer chains, whereby at least one of the block copolymer chains have an alkoxyamine end group; depositing the second product mixture on a substrate having surface bound norbornene silane molecules; and reacting at least one of the alkoxyamine end groups with at least one of the surface bound norbornene silane molecules.

23. A flow cell, comprising: a substrate; and a copolymer coating attached to at least a portion of the substrate, the copolymer coating including a plurality of copolymer chains, wherein each copolymer chain includes:

a first recurring unit of formula (I):

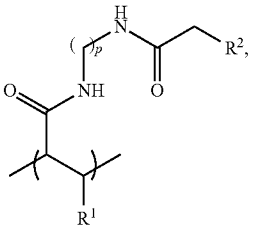

wherein: R' is selected from the group consisting of —H, a halogen, an alkyl, an alkoxy, an alkenyl, an alkynyl, a cycloalkyl, an aryl, a heteroaryl, a heterocycle, and optionally substituted variants thereof; $R^2$ is an azido; each $(CH_2)p$ can be optionally substituted; and p is an integer from 1 to 50; and a second recurring unit of formula II

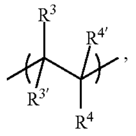

wherein each of $R^3$, $R^3$, $R^4$, $R^4$ is independently selected from the group consisting of —H, $R^5$, —$OR^{5'}$, —C(O) $OR^{5'}$, —$C(O)R^5$, —$OC(O)R^5$, —C(O) $NR^6R$, and —$NR^6R^7$-$R^5$ is selected from the group consisting of —H, —OH, an alkyl, a cycloalkyl, a hydroxyalkyl, an aryl, a heteroaryl, a heterocycle, and optionally substituted variants thereof; and each of $R^6$ and $R^7$ is independently selected from the group consisting of —H and an alkyl; and a third recurring unit of formula

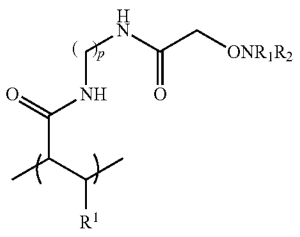

wherein: R' is selected from the group consisting of —H, a halogen, an alkyl, an alkoxy, an alkenyl, an alkynyl, a cycloalkyl, an aryl, a heteroaryl, a heterocycle, and optionally substituted variants thereof; $R_1$ and $R_2$ are independently selected from a carbon based substituent; each $(CH_2)p$ can be optionally substituted; and p is an integer from 1 to 50.

24. The flow cell as defined in claim 23, wherein at least one of the copolymer chains include at least one alkoxyamine end group.

25. A method, comprising: adding i) a nitroxide mediated polymerization unimolecular initiator or ii) a combination of a water soluble initiator and a nitroxide to a mixture of a monomer of

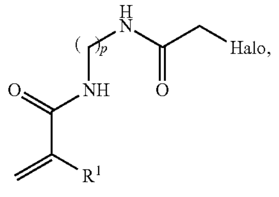

formula (V), and monomer of formula (IV):

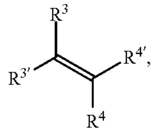

wherein: for formula (V): R' is selected from the group consisting of —H, a halogen, an alkyl, an alkoxy, an alkenyl, an alkynyl, a cycloalkyl, an aryl, a heteroaryl, a heterocycle, and optionally substituted variants thereof; halo is a halogen; each $(CH_2)p$ can be optionally substituted; and p is an integer from 1 to 50; and for formula (IV): each of $R^3$, $R^3$, $R^4$, $R^4$ is independently selected from the group consisting of —H, $R^5$, —$OR^{5'}$, —C(O) $OR^{5'}$, —$C(O)R^5$, —$OC(O)R^5$, —$C(O)NR^6R^7$, and —$NR^6R^7$-$R^5$ is selected from the group consisting of —H, —OH, an alkyl, a cycloalkyl, a hydroxyalkyl, an aryl, a heteroaryl, a heterocycle, and optionally substituted variants thereof; and each of $R^6$ and $R^7$ is independently selected from the group consisting of —H and an alkyl; thereby generating a copolymer; and after the copolymerization, converting at least one of the halogens to alkoxyamines and at least another one of the halogens to azides.

26. The method as defined in claim 25, wherein converting at least one of the halogens to alkoxyamines and at least another one of the halogens to azides involves: introducing a hydroxylamine to the copolymer so that the halogens are in excess of the hydroxylamine; heating the copolymer to initiate a reaction where the hydroxylamine displaces at least one of the halogens; introducing $NaN_3$ to the copolymer; and heating the copolymer to initiate a reaction where the azide displaces at least another one of the halogens.

27. The method as defined in claim 25, wherein converting at least one of the halogens to hydroxyamines and at least one other of the halogens to azides involves: introducing a mixture of hydroxylamine and $NaN_3$ to the copolymer; and heating the copolymer to initiate a reactions where the hydroxylamine displaces at least one of the halogens and where the azide displaces at least one other of the halogens.

28. The method as defined in claim 25, wherein converting at least one of the halogens to hydroxyamines and at least another one of the halogens to azides involves: deprotonating a hydroxylamine to form an alkoxyamine anion; introducing the alkoxyamine anion to the copolymer so that the halogens are in excess of the alkoxyamine anion; heating the copolymer to initiate a reaction where the alkoxyamine anion displaces at least one of the halogens; introducing $NaN_3$ to the copolymer; and heating the copolymer to initiate a reaction where the azide displaces at least another one of the halogens.

* * * * *